US012773868B2

(12) United States Patent
Lester et al.

(10) Patent No.: US 12,773,868 B2
(45) Date of Patent: Oct. 27, 2026

(54) HIGH SPEED LASER PROCESSES FOR MARKING ON ARTICLES

(71) Applicant: The Procter & Gamble Company, Cincinnati, OH (US)

(72) Inventors: Joseph Craig Lester, Liberty Township, OH (US); Marc Andrew Mamak, Mason, OH (US); Joseph Henry Nurre, West Chester, OH (US); Anthony Ogg, West Chester Township, OH (US); Philip Andrew Sawin, Wyoming, OH (US)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 731 days.

(21) Appl. No.: 17/963,214

(22) Filed: Oct. 11, 2022

(65) Prior Publication Data

US 2023/0124975 A1 Apr. 20, 2023

Related U.S. Application Data

(60) Provisional application No. 63/255,595, filed on Oct. 14, 2021.

(51) Int. Cl.

| | |
|---|---|
| ***B41J 2/44*** | (2006.01) |
| ***B41M 5/24*** | (2006.01) |
| ***B41M 5/26*** | (2006.01) |
| *B41C 1/05* | (2006.01) |
| *B41J 2/435* | (2006.01) |
| *B41J 2/45* | (2006.01) |
| *B44C 1/22* | (2006.01) |

(52) U.S. Cl.

CPC ................ *B41M 5/24* (2013.01); *B41J 2/442* (2013.01); *B41M 5/26* (2013.01); *B41C 1/05* (2013.01); *B41J 2/435* (2013.01); *B41J 2/45* (2013.01); *B44C 1/228* (2013.01)

(58) Field of Classification Search

CPC ... B41M 5/24; B41M 5/26; B41J 2/442; B41J 2/435; B41J 2/45; B41C 1/05; B44C 1/228

See application file for complete search history.

(56) References Cited

U.S. PATENT DOCUMENTS

| | | | |
|---|---|---|---|
| 3,490,290 | A | 1/1970 | Bilson |
| 4,990,792 | A | 2/1991 | Frei |
| 5,123,574 | A | 6/1992 | Poulos |

(Continued)

FOREIGN PATENT DOCUMENTS

| | | | |
|---|---|---|---|
| CN | 101564947 | B | 12/2010 |
| CN | 101784393 | B | 3/2013 |

(Continued)

OTHER PUBLICATIONS

All Office Actions; U.S. Appl. No. 18/127,965, filed Mar. 29, 2023.

(Continued)

*Primary Examiner* — Henok D Legesse

(74) *Attorney, Agent, or Firm* — Matthew J Spegele

(57) ABSTRACT

Processes for laser marking articles having a predetermined feature marked onto a wall that is either user readable, machine readable, or both. Also, methods of making the marked articles by laser marking.

20 Claims, 9 Drawing Sheets

(56) References Cited

U.S. PATENT DOCUMENTS

| | | | |
|---|---|---|---|
| 5,429,908 | A | 7/1995 | Hokuf |
| 6,118,096 | A | 9/2000 | Feng et al. |
| 6,423,399 | B1 | 7/2002 | Endo |
| 6,681,055 | B1 | 1/2004 | Sato |
| 7,009,633 | B2 | 3/2006 | Steenackers |
| 7,394,479 | B2 | 7/2008 | Assa |
| 7,649,154 | B2 | 1/2010 | Ripperger et al. |
| 8,663,754 | B2 | 3/2014 | Liu et al. |
| 9,168,696 | B2 | 10/2015 | Farrell |
| 9,269,035 | B2 | 2/2016 | Redd |
| 9,636,776 | B2 | 5/2017 | Dallarosa et al. |
| 9,764,563 | B2 | 9/2017 | Song et al. |
| 10,365,499 | B2 | 7/2019 | Schaur et al. |
| 10,377,145 | B2 | 8/2019 | Song et al. |
| 10,942,055 | B1 | 3/2021 | Zhong |
| 2004/0247829 | A1 | 12/2004 | Depres |
| 2005/0218126 | A1 | 10/2005 | Leyvraz |
| 2006/0197826 | A1 | 9/2006 | Assa et al. |
| 2010/0209698 | A1 | 8/2010 | Kornherr |
| 2011/0198837 | A1 | 8/2011 | Parrinello |
| 2012/0324997 | A1 | 12/2012 | Tharp |
| 2014/0206030 | A1 | 7/2014 | Gelfand |
| 2014/0305831 | A1 | 10/2014 | Hansen |
| 2015/0049593 | A1 | 2/2015 | Oliveira |
| 2016/0243646 | A1 | 8/2016 | Kleinert et al. |
| 2016/0256955 | A1* | 9/2016 | Andrei ............... B23K 26/0006 |
| 2016/0263701 | A1 | 9/2016 | Li et al. |
| 2018/0229920 | A1 | 8/2018 | Vanderstraeten et al. |
| 2018/0350271 | A1 | 12/2018 | Schmitt |
| 2019/0056322 | A1 | 2/2019 | Schulz et al. |
| 2019/0112091 | A1 | 4/2019 | Neufarth et al. |
| 2019/0138867 | A1 | 5/2019 | Vander Aa |
| 2019/0193445 | A1 | 6/2019 | Harrison et al. |
| 2021/0334056 | A1 | 10/2021 | Gabato et al. |
| 2022/0097414 | A1 | 3/2022 | Hirayama |
| 2022/0281254 | A1 | 9/2022 | Kokkelenberg |
| 2022/0410608 | A1 | 12/2022 | Hirayama et al. |
| 2023/0211624 | A1 | 7/2023 | Sato |
| 2024/0326157 | A1 | 10/2024 | Sawin |
| 2024/0326171 | A1 | 10/2024 | Lester |
| 2024/0326500 | A1 | 10/2024 | Neumann |
| 2024/0326502 | A1 | 10/2024 | Neumann |
| 2024/0328844 | A1 | 10/2024 | Lester |
| 2024/0328845 | A1 | 10/2024 | Lester |
| 2024/0391019 | A1 | 11/2024 | Lester |
| 2025/0083464 | A1 | 3/2025 | Neumann et al. |

FOREIGN PATENT DOCUMENTS

| | | | |
|---|---|---|---|
| CN | 103415801 | A | 11/2013 |
| CN | 104349887 | A | 2/2015 |
| CN | 102325626 | B | 7/2015 |
| CN | 106030617 | A | 10/2016 |
| CN | 106274107 | A | 1/2017 |
| CN | 106423312 | A | 2/2017 |
| CN | 106674948 | A | 5/2017 |
| CN | 107672335 | A | 2/2018 |
| CN | 109153277 | A | 1/2019 |
| EP | 0327508 | A2 | 8/1989 |
| EP | 1939002 | A2 | 7/2008 |
| EP | 2184738 | A1 | 5/2010 |
| EP | 3088200 | A1 | 11/2016 |
| EP | 3711966 | A1 | 9/2020 |
| GB | 2421221 | A | 6/2006 |
| JP | S63295080 | A | 12/1988 |
| JP | 3705081 | B2 | 12/2001 |
| JP | 2002144055 | A | 5/2002 |
| JP | 2002283073 | A | 10/2002 |
| JP | 2005066653 | A | 3/2005 |
| JP | 2006255718 | A | 9/2006 |
| JP | 3141949 | U | 5/2008 |
| JP | 5427899 | B2 | 12/2013 |
| JP | 2015100808 | A | 6/2015 |
| JP | 6038889 | B2 | 11/2016 |
| JP | 2017117218 | A | 6/2017 |
| JP | 6220587 | B2 | 10/2017 |
| JP | 2018192800 | A | 12/2018 |
| JP | 2019026285 | A | 2/2019 |
| JP | 2019034752 | A | 3/2019 |
| JP | 2019521855 | A | 8/2019 |
| JP | 2020152435 | A | 9/2020 |
| WO | 9412352 | A1 | 6/1994 |
| WO | 0035678 | A1 | 6/2000 |
| WO | 2010011227 | A1 | 1/2010 |
| WO | 2012119164 | A2 | 9/2012 |
| WO | 2012145306 | A2 | 10/2012 |
| WO | 2012150926 | A1 | 11/2012 |
| WO | 2013183000 | A1 | 12/2013 |
| WO | 2015082869 | A1 | 6/2015 |
| WO | 2016162753 | A1 | 10/2016 |
| WO | 2016173204 | A1 | 11/2016 |
| WO | 2017198986 | A1 | 11/2017 |
| WO | 2021219850 | A1 | 11/2021 |
| WO | 2023064739 | A1 | 4/2023 |
| WO | 2023064740 | A1 | 4/2023 |

OTHER PUBLICATIONS

All Office Actions; U.S. Appl. No. 18/127,976, filed Mar. 29, 2023.

All Office Actions; U.S. Appl. No. 18/128,359, filed Mar. 30, 2023.

All Office Actions; U.S. Appl. No. 18/128,341, filed Mar. 30, 2023.

All Office Actions; U.S. Appl. No. 18/128,347, filed Mar. 30, 2023.

All Office Actions; U.S. Appl. No. 18/128,356, filed Mar. 30, 2023.

Unpublished U.S. Appl. No. 18/127,965, filed Mar. 29, 2023, to Joseph Craig Lester et al.

Unpublished U.S. Appl. No. 18/127,976, filed Mar. 29, 2023, to Joseph Craig Lester et al.

Unpublished U.S. Appl. No. 18/128,359, filed Mar. 30, 2023, to Joseph Craig Lester et al.

Unpublished U.S. Appl. No. 18/128,341, filed Mar. 30, 2023 to Matthew Aaron Neumann et al.

Unpublished U.S. Appl. No. 18/128,347, filed Mar. 30, 2023 to Matthew Aaron Neumann et al.

Unpublished U.S. Appl. No. 18/128,356, filed Mar. 30, 2023 to Philip Andrew Sawin et al.

All Office Actions; U.S. Appl. No. 18/618,205, filed Mar. 27, 2024.

All Office Actions; U.S. Appl. No. 18/631,142, filed Apr. 10, 2024.

Unpublished U.S. Appl. No. 18/618,205, filed Mar. 27, 2024, to Joseph Craig Lester et al.

Unpublished U.S. Appl. No. 18/631,142, filed Apr. 10, 2024, to Joseph Craig Lester et al.

All Office Actions; U.S. Appl. No. 17/987,893, filed Nov. 16, 2022.

All Office Actions; U.S. Appl. No. 17/987,895, filed Nov. 16, 2022.

All Office Actions; U.S. Appl. No. 17/963,215, filed Oct. 11, 2022.

Unpublished U.S. Appl. No. 17/963,215, filed Oct. 11, 2022, to Joseph Craig Lester et al.

Unpublished U.S. Appl. No. 17/987,893, filed Nov. 16, 2022, to Joseph Craig Lester et al.

Unpublished U.S. Appl. No. 17/987,895, filed Nov. 16, 2022, to Joseph Craig Lester et al.

PCT Search Report and Written Opinion for PCT/US2022/077869 dated Feb. 8, 2023,10 pages.

All Office Action: U.S. Appl. No. 18/956,144, filed Nov. 22, 2024.

Unpublished U.S. Appl. No. 18/956,144, filed Nov. 22, 2024, Matthew Aaron Neumann et al.

* cited by examiner

HIGH SPEED LASER PROCESSES FOR MARKING ON ARTICLES

FIELD OF THE INVENTION

The present invention relates to processes for laser marked articles, and methods for marking such articles.

BACKGROUND OF THE INVENTION

Short-pulse laser decoration utilizes energy from nano, pico and femto short pulse lasers across a variety of wavelengths and energies to mark decorative patterns onto articles such as products and/or packages. Any and all other decoration techniques that may apply to the product and/or package (i.e. labels, screen print, digital print, etc.) can be used together with laser marking to achieve various decorative and functional effects. The laser technique used in short pulse laser marking is, importantly, a high through-put technique which uses a stationary laser source from which the laser beam is directed by means of electronically/mechanically controlled mirrors (i.e. "galvo" sets) and lenses (i.e. F-theta and similar lenses) to the product or package being marked. These mirrors and lenses steer the laser beam across the surface of the article (this steering is also called "scanning") so that the laser can impart an image, such as a digital image (for example from a computer file such as a PDF file) to the surface of the package or product. This approach has further advantages over other decoration techniques in that the use of a digital image allows for customization and personalization of the decoration.

There is a great deal of interest in the possibilities presented by laser-marking articles such as by means of short-pulse laser marking. For example, replacing adhesive labels on polymer containers is not only economically beneficial, but ecologically beneficial as well Eliminating adhesive labels on polymer containers, for example, decreases the total weight of the packaging material which reduces the amount of petroleum-derived material per package and reduces the weight of the packaging thereby requiring less fuel for shipping. Further, the absence of an adhesive label enables the polymeric container to be more easily recycled since adhesive labels often need to be removed prior to recycling due to the potential impurities which may be introduced to the recycle stream.

Laser marking of small articles (i.e. golf balls, etc.) and/or small regions on articles (i.e. date codes on finished packages, address labels) is known. While lasers are improving, and newer lasers have a variety of energies and wavelengths, these marking processes can still be slow and expensive. Further, they do not have the ability to mark small characters that require high-precision such as small-font text (i.e. usage instructions, ingredient listing) comprised of alphanumeric characters. For example, date codes are marked onto packages by relatively quick lasers, but they employ single lines of large, imprecisely, or unequally spaced spots (in the range of 250 μm to greater than 800 μm in diameter) and relatively large font characters. This is equivalent to printing stick figures, which are adequate for some purposes but difficult for consumers to read and almost impossible for machines to read. More specifically, single lines of large, imprecisely, or unequally spaced spots cannot currently be used to mark high-precision small font text or machine-readable graphics such as UPC or QR codes on articles.

The current state of the art for laser marking processes includes "raster" marking processes and "vector" marking processes which are either fast but with poor precision and resolution, or slow but with higher precision and resolution. The combination of high speed and high precision does not exist in the prior art. This problem is particularly notable when marking large areas on articles, such as when using laser-marking as a full replacement for other decoration techniques, where all the text and/or graphics provided on at least one face of the article (much of which is required for regulatory purposes) is provided via laser-marking.

A raster laser marking process lays down individual laser marks in a grid, and the image is marked by the laser row by row, point by point. Each of the pulses is "gated" such that pulses are only fired for a dark pixel of the image and no pulse is fired for the light pixel of the image (or visa versa). Each of the pulses is individually gated and the pulse energy of each pulse can be varied to produce grayscale. State-of-the-art raster marking processes are effectively limited to lasers with a ~100 kHz repetition rate given the practical limit of a ~10 us update rate in signaling the laser's on/off function (i.e. "gating") and can only be made faster by increasing the pulse-spacing, which can sacrifice fine detail, such as required to mark small-font text and graphics.

State of the art vector marking processes can be run above 100 kHz as the pulses are typically gated open while the laser beam is "steered" (by mirrors) in the shape of the vector-lines being marked. Vector-marked articles comprising text can often be recognized as the marked lines are typically one-pulse wide (unless in-filled) and the pulses become closer together near the corners, where the surface velocity of the laser beam was slowed as it turned the corner. However, it has been found that the accuracy of the placement of the marks with vector-marking suffers at very high surface velocities of the laser beam.

Currently, somewhat high-speed laser-marking can be achieved by polygon scanners (e.g. High Throughput Raster Processing Polygon scanner systems from Next Scan Technology, Evergem, Belgium), which can be optimized for high speed and accuracy. The polygon scanner systems employ a rotating polygon mirror for row scanning. These scanners are typically used for full-surface processing of a regular pattern. Specifically, the field of view is typically a square, which is relatively large by printing standards, and a repeated pattern is marked in its entirety over and over again on subsequent articles. The square field of view configuration of these scanners do not lend them to accurate marking of things like small characters, alphanumeric characters, logos, pictures and the like.

Thus, there remains the need for faster, more economical, and more precise laser-marking. Both the hardware and the software that controls the lasing devices can be improved as well as the methods of using these improved lasing devices. Further, the disposition of the laser marks on the article can be improved to provide for both precision and speed.

Thus, it would be desirable to provide improved lasing devices together with software for operating the lasing devices and a process to mark articles with high-speed and high-precision (such as directly reproducing label information, aesthetic and functional features). These improvements should make the process fast, simple, cost-effective and scalable to mass manufacture and allow for the resulting articles to have consumer and machine-readable features that, among other benefits, can replace labels and adhesives.

SUMMARY OF THE INVENTION

The present invention provides a solution for one or more of the deficiencies of the prior art as well as other benefits. The specification, claims and drawings describe various features and embodiments of the invention, including a method for marking an article with a pulsed laser, the process having the steps of, providing a pulsed laser configured to produce a laser beam that are pulses, providing an article comprising an article surface, using the laser beam to form a plurality of marks on the article surface in a grid pattern by at least one of foaming, ablating, etching, reducing, oxidizing, and carbonizing. The process further includes moving the laser beam while interacting with the article surface along a first row at a constant velocity while forming the plurality of marks, and wherein the constant velocity is greater than about 8 m/s, preferably greater than about 10 m/s, even more preferably greater than about 15 m/s and most preferably greater than about 18 m/s or greater than about 22 m/s or greater than about 32 m/s or greater than about 45 m/s or greater than about 60 m/s or greater than about 75 m/s or greater than about 90 m/s.

The method of this embodiment may further include the steps of moving the laser beam in a bi-directional motion such that the laser beam moves across a first row in a first direction and moves across a second row in a second direction, wherein the first direction is opposite the second direction, preferably, the first and second row are adjacent. The grid pattern may have a plurality of locations positioned in two or more rows, wherein the two or more rows are substantially parallel, each adjacent pair of locations of the plurality of locations along any of the two or more rows is separated by an X-distance and each adjacent pair of the two or more rows is separated by a Y-distance, and the Y-distance and the X-distance are different. Each of the plurality of locations may include either a mark or a void (the lack of a mark at a grid location).

In another embodiment the laser beam moves across each of the locations of the grid pattern, and the laser beam moves at the constant velocity as consecutive marks are formed on adjacent locations in the same row. The laser beam can accelerate as the laser beams moves across consecutive locations having a void. Further, the laser beam has a turnaround deceleration/acceleration profile as the laser beam moves from a first row to a second row.

There is further provided a method where the laser beam has a repetition rate greater than about 100 kHz, preferably greater than about 200 kHz, even more preferably greater than about 500 kHz, and most preferably greater than about 1000 kHz. Moreover, the laser beam has a pulse energy of from about 10 μJ to about 1000 μJ, preferably from about 20 μJ to about 800 μJ, more preferably from about 30 μJ to about 600 μJ, and even more preferably from about 40 μJ to about 500 μJ. Further, the laser beam has a focal length from about 100 mm to about 1200 mm, preferably from about 200 mm to about 380 mm, and the laser beam has a wavelength of from about 300 nm to about 1100 nm. The laser beam may also have a pulse duration of less than about 100 nanoseconds, preferably less than about 50 nanoseconds, even more preferably less than about 30 nanoseconds, and most preferably less than about 1.5 nanoseconds.

In another embodiment of the present invention there is provided a method for marking an article with a pulsed laser, the process having the steps of, providing a pulsed laser configured to produce a laser beam comprising pulses, providing an article having an article surface, using the laser beam to form a plurality of marks on the article surface in a grid pattern by at least one of foaming, ablating, etching, reducing, oxidizing, and carbonizing. The laser beam is moved across each of the locations of the grid pattern, the laser beam moves at a constant velocity as consecutive marks are formed on adjacent locations in the same row, and the laser beam accelerates as it moves across consecutive locations having at least three voids.

In yet another embodiment of the present invention, there is a process for marking an article with a pulsed laser, the process having the steps of providing a laser source configured to emit a pulsed laser beam, providing a first galvanometer ("galvo") set and a second galvo set configured to redirect the pulsed laser beam, wherein each galvo set comprises a mirror and a galvo, providing an article having an article surface, rotating the first mirror with the first galvo at a first angular velocity while marking the article surface, wherein the first angular velocity is greater than about 40 rad/sec, rotating the second mirror with the second galvo at a second angular velocity while marking the article surface, wherein the second angular velocity is greater than about 40 rad/sec, preferably greater than about 50 rad/s, even more preferably greater than about 70 rad/s and most preferably greater than about 100 rad/s. The first galvo set may control the motion of the laser beam in the Y-direction of the grid and the second galvo set may control the motion of the laser beam in the X-direction. The ratio of the angular velocity of the second galvo to that of the first galvo may be 1:1, 1.5:1 or 2:1. There are a plurality of marks formed by at least one of foaming, ablating, etching, reducing, oxidizing, and carbonizing the article surface with the laser beam. In this embodiment the first mirror and the second mirror may each have a mass less than about 150 g each. Further, the first mirror has a first mass and the second mirror has a second mass, wherein the first mass is less than the second mass, and wherein the first mirror controls the movement of the laser beam in the X-direction. The ratio of the mass of the first mirror to that of the second mirror may be 1:1, 1.5:1 or 2:1.

This method may further include the steps of the laser beam interacting with the article surface to form the plurality of marks in a grid pattern, the grid pattern comprising a plurality of locations positioned in two or more rows, where the two or more rows are substantially parallel, each adjacent pair of locations along any of the two or more rows is separated by an X-distance, each adjacent pair of the two or more rows is separated by a Y-distance, and the Y-distance and the X-distance are different. The laser beam can be moved across each of the locations of the grid pattern at a constant velocity as consecutive marks or voids are formed on adjacent locations in the same row, the laser beam can accelerate as the laser beams moves across consecutive locations having a void, and wherein the constant velocity is greater than about 8 m/s, preferably greater than about 10 m/s, even more preferably greater than about 15 m/s and most preferably greater than about 18 m/s or greater than about 22 m/s or greater than about 32 m/s or greater than about 45 m/s or greater than about 60 m/s or greater than about 75 m/s or greater than about 90 m/s.

The present invention provides many benefits over the prior art including increased speed and accuracy of marking. Because the laser marking can, for example, be used to create consumer-readable alphanumeric characters (including small font characters) to form sentences, paragraphs, and the like, as well as other methods of visual communication (e.g. graphics) on an article, it can replace the need for traditional labels. Specifically, the processes and articles of this invention can provide for laser marked ingredient listings, use instructions, machine-readable graphics such as UPC or QR codes, and the like, in a fast, cost-effective manner without labels and adhesives. This provides cost savings, is environmentally friendly (fewer wasteful stickers on a package) and allows for instantaneous change is the message communicated to the consumer. For example, if an ingredient is changed in a formula, new ingredient labels can be marked on the article as soon as the change can be made in the computer instructions to the laser apparatus. No new labels are required.

DETAILED DESCRIPTION OF THE INVENTION

Article

"Article", as used herein refers to an individual object such as an object for consumer usage, such as a container suitable for containing materials or compositions. The article may be a container, non-limiting examples of which include bottles, tubes, films, laminates, bags, wraps, drums, jars, cups, caps, and the like. The compositions contained in such containers may be any of a variety of compositions including, but not limited to detergents (e.g., laundry detergent, fabric softener, dish care, skin and hair care), beverages, powders, paper (e.g., tissues, wipes), diapers, beauty care compositions (e.g., cosmetics, lotions), medicinal, oral care (e.g., toothpaste, mouth wash), and the like. Containers may be used to store, transport, and/or dispense the materials and/or compositions contained therein.

The article can be made of any a variety of common materials including; PET, PETG, HDPE, PP, PVOH, LDPE, LLDPE, steel, glass, aluminum, cellulose, pulp, paper, etc.

Figure 1:
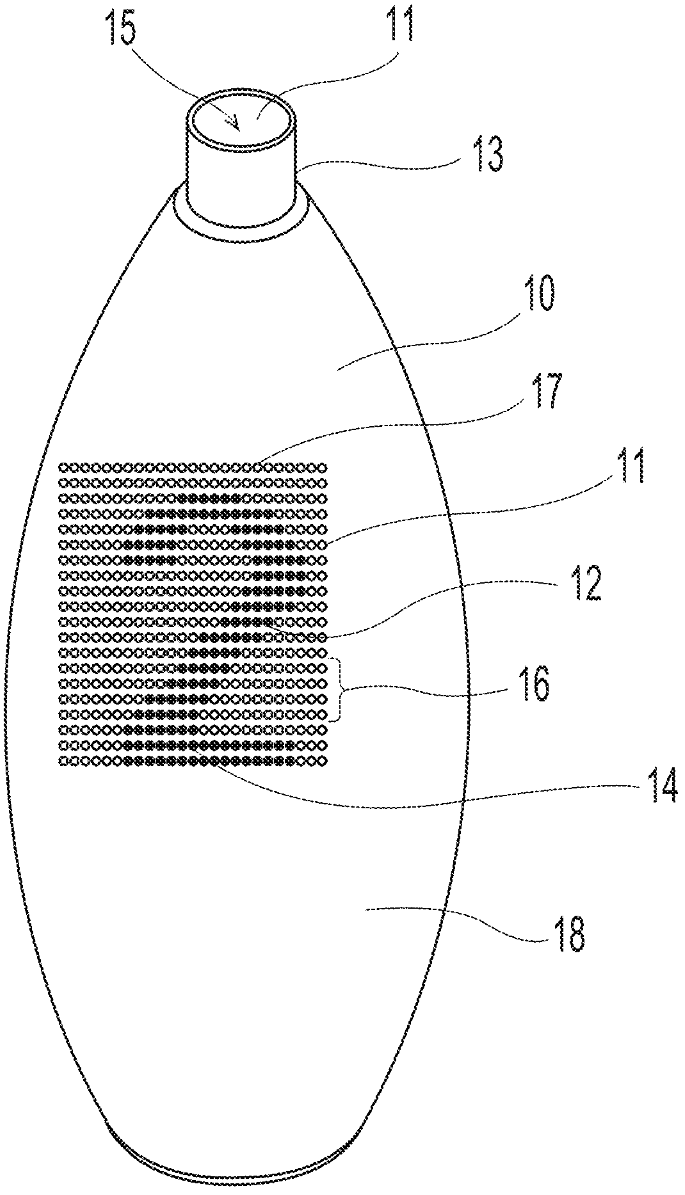
FIG. 1 is an article in accordance with the present invention marked with an alphanumeric character in a grid pattern.

FIG. 1 shows an article 10 having a predetermined feature 17 laser marked as a grid 16. The predetermined feature 17 can be consumer readable, machine readable or both. Predetermined feature 17 can be, for example, an alphanumeric character, a company logo, a drawing, artwork, UPC or QR codes, and the like. In this instance, the marked locations 12 make up an alphanumeric character 14, which in this case is the number two, "2". The unmarked locations 11 in grid 16 are shown for illustration purposes only and do not appear on the final marked article 10. Article 10 is shown as a container and has an opening 11 and a neck 13 that provides access to the interior space 15

An article according to the present invention may be formed of a single thermoplastic material or resin or from two or more materials that are different from each other in one or more aspects. The two or more materials may comprise layers within the article. Where the article has different layers, the materials making up each of the layers can be the same or different from any other layer. For example, the article may comprise one or more layers of a thermoplastic resin, selected from the group consisting of polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), or a polyolefin, for example one of low-density polyethylene (LDPE), linear low-density polyethylene (LLPDE), high-density polyethylene (HDPE), propylene (PP) and a combination thereof. The article may also comprise cellulosic materials such as pulp or paper. The cellulosic material may be included with an additional second material which may be a second cellulosic material or may comprise a resin including thermoplastic material or water/solvent borne coating.

Recycled thermoplastic and/or cellulosic materials may also be used, e.g., post-consumer recycled ("PCR") materials, post-industrial recycled ("PIR") materials and regrind materials, such as, for example polyethylene terephthalate (PCRPET), high density polyethylene (PCRHDPE), low density polyethylene (PCRLDPE), polyethylene terephthalate (PIRPET) high density polyethylene (PIRHDPE), low density polyethylene (PIRLDPE) and others.

The thermoplastic materials may include monomers derived from renewable resources and/or monomers derived from non-renewable (e.g., petroleum) resources or a combination thereof. For example, the thermoplastic resin may comprise polymers made from bio-derived monomers in whole, or comprise polymers partly made from bio-derived monomers and partly made from petroleum-derived monomers.

Pigments, colorants, and laser absorption additives may be added to the material of the articles of the present invention. Suitable choice of the laser wavelength in combination with pigments/colorants/additives may provide for suitable marking of the article. In cases where the contrast or speed of the marking is not sufficient, these pigments/colorants/additives may facilitate absorption of the laser energy, thereby serving as laser absorption additives. Laser absorption additives, which are known to those skilled in the art, can facilitate forming the laser-marks and can make the laser-markings more vivid and more easily read by users and machines, as well as increase the rate at which the article can be marked. These laser absorption additives generally absorb the laser energy specific to the laser wavelength, followed by initiating a color change to the surrounding matrix (via local heating to cause carbonization, foaming, etc.) or the laser absorption additive itself undergoes a chemical or physical change. Titanium dioxide and carbon black are pigments commonly used to opacify containers in order to protect the contents from the effects of light and can also serve as laser absorption additives depending on the wavelength of the laser being used. Additional examples of laser absorption additives include: titanium dioxide ($TiO_2$), antimony tin oxide (ATO), ATO coated substrates such as mica, $Sb_2O_3$, indium tin oxide, tin oxides, iron oxides, zinc oxide, carbon black, graphitic carbon, bismuth oxide, mixed metal oxides, metal nitrides, doped metal nitrides, metal carbides, metal borides, tungsten oxides, doped tungsten oxides, pearlescent pigments, zero valent metals such as aluminum, and mixtures thereof. An example of laser marking laser absorption additives are those commonly sold under the tradename "Iriotec®" by Merck KGaA of Darmstadt Germany.

Laser and Lasing Apparatus

A pulse laser such as a short pulse laser may be used to mark the articles according to the present invention. Lasers for use in the present invention are commercially available and include nano, pico, and femto second lasers. These short pulse lasers can emit pulses applied at high energy-densities and high repetition rates, the high energies and high repetition rates are important to allow laser-marking the article at high speed. The laser marks themselves include marks made by oxidation, reduction, ablation, etching, foaming, and carbonization to the article such as a product or package.

Figure 2:
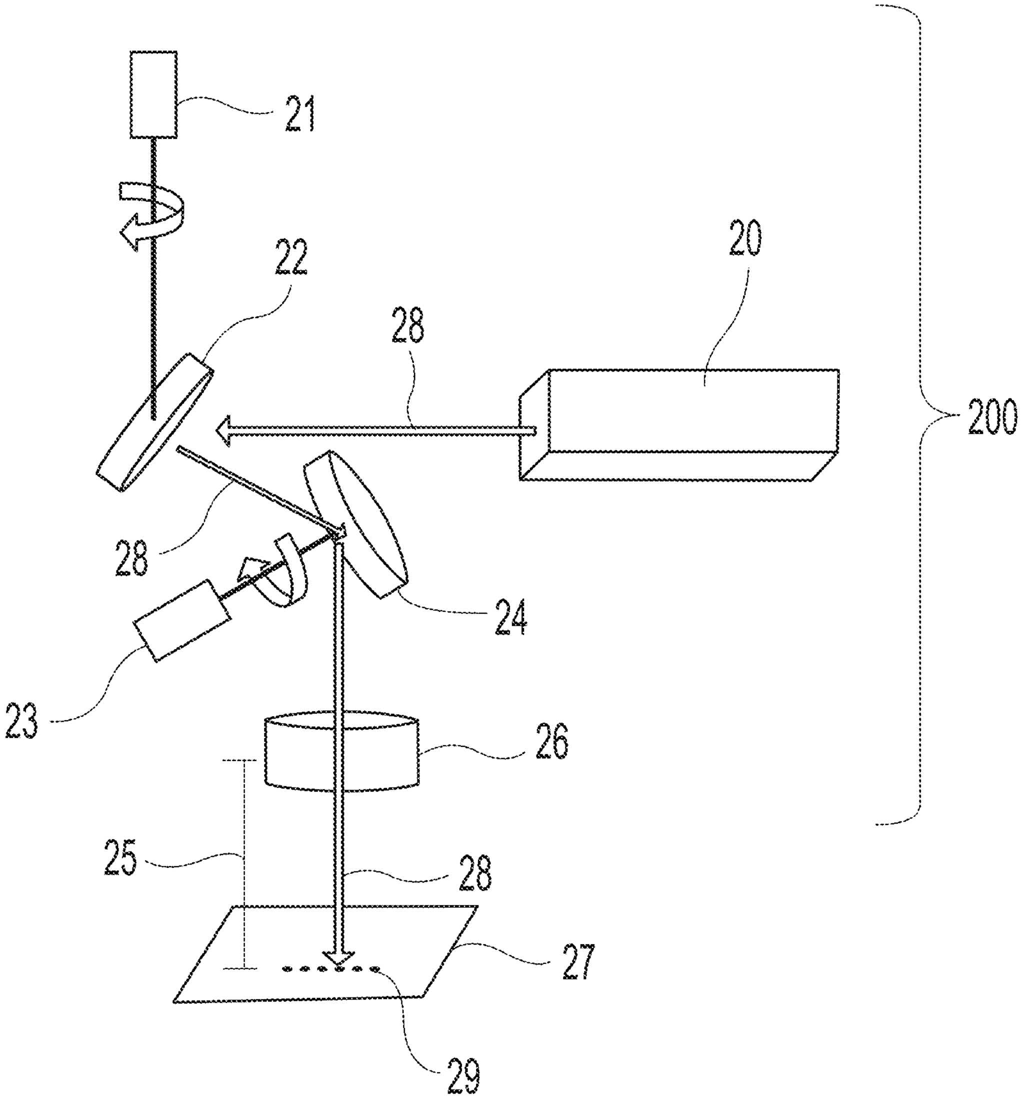
FIG. 2 is a schematic view of a lasing apparatus according to the present disclosure.

Any suitable laser can be used to mark the article 10. FIG. 2 shows one example of a lasing apparatus 200 comprising a laser 20 useful for marking an article in accordance with the present invention. The lasing apparatus 200 includes a laser 20 which may be any laser capable of generating sufficient energy to mark the articles, such as a UV laser, having power in the range of 1 W to 60 W, and a laser wavelength of 355 nanometers or an IR marking laser, having a power in the range of 1 W to 300 W, or even 500 W, and a laser wavelength of 1064 nanometers. Such lasers are available from various suppliers, including an IPG ULPN-355-10-1-3-M marker or YLPN-1-1×350-50-3M MOPA module, available from IPG Photonics of Oxford, MA, United States. Other makes and types of lasers are also possible and different power ranges and settings may be used. The lasing apparatus can include optics that can be used to direct the laser beam, and/or to modify the laser beam such as by changing the energy density and/or spot size of the laser beam 28, as desired.

Frequency or Repetition Rate, measured in Hz, is the number of laser pulses a single laser can deliver in a second. For instance, a 1 MHz laser delivers 1,000,000 pulses per second where a 100 kHz repetition rate laser delivers 100,000 pulses per second. Repetition rate can be important for processing a particular lasing job in a short amount of time (i.e. high-speed laser marking). The more pulses per unit time available correlates (inversely) to the time required to mark a given row for a particular job almost linearly.

Pulse Energy is the amount of energy a single laser pulse contains and is typically measured in μJ or mJ. Typically, pulse energy is in the range of 5 uj to 2000 uJ (2 mJ), preferably in the range of 70-10000, and more preferably 10 uJ-300 μJ. The average power of the laser, then, is given as the pulse energy times the repetition rate.

$$\text{Average power}=\text{pulse energy}(J)*rep\ \text{rate}(\text{Hz or } 1/\text{sec}).$$

Peak power is equal to pulse energy divided by pulse duration, and pulse duration can be less than 100 nanoseconds, less than 50 nanoseconds, less than 20 nanoseconds, less than 10 nanoseconds, or less than 1 nanosecond. Therefore, pulse energy and pulse duration are linearly related to peak power. Shorter pulse durations achievable with nanosecond, picosecond and femtosecond lasers allow for very high peak power which aids in the ability to mark articles.

In the lasing apparatus 200 depicted in FIG. 2, the laser 20 projects laser beam 28 onto X-mirror 22 which is rotated by X-galvo 21. X-mirror 22 and X-galvo 21 collectively form an X-galvo set. Laser beam 28 is then projected onto Y-mirror 24 which is rotated by Y-galvo 23. Y-mirror 24 and Y-galvo 23 collectively form a Y-galvo set. The X and Y mirrors 22 and 24 respectively, work together to direct laser beam 28 to the location where the desired mark 29 is to be marked on article 27. Before laser beam 28 reaches article 27, it will typically go through a lens 26. The distance from lens 26 to article 27 is the focal length 25.

The combined optics of the lasing apparatus may function so as to sweep the laser beam across the surface of the article in successive passes. The laser beam may sweep across the article along a first row in the grid in an X-direction, being directed by the X-mirror, while emitting (or omitting) pulses. The combination of the sweep-speed of the laser beam across the surface of the article, also called the surface velocity of the laser beam, and the repetition rate of the laser pulses, then, determines the spacing of marks along the X-direction.

$$\text{X-Spacing}*\text{Repetition Rate}=\text{Surface Velocity}$$

The laser may emit a pulse or pulses while sweeping across the article at a given location thereby resulting in a marked location (or locations), or the laser may omit pulse (s) while sweeping across the article at a given location thereby resulting in unmarked location(s) (i.e. void(s)). The laser beam may be swept across the article at a constant velocity while emitting and/or omitting pulses. The surface velocity or sweep-speed is defined above. The laser beam may subsequently sweep across the article along a second row of the grid (such as a row adjacent to the first row) while emitting (or omitting) pulses. The laser beam may sweep across the first and second rows in the same direction or in opposite directions. For example, the laser beam may sweep across the first row from "left-to-right" and across the subsequent/adjacent row from "right-to-left".

Those skilled in the art will appreciate that the laser energy must be absorbed by the article's material in order for the article to be marked. The laser energy may be absorbed by the base material of the article or by a laser absorption additive incorporated in the article. The wavelength of the laser can coincide with an absorption band, band gap energy, or surface plasmon/plasma resonance frequency in the UV-vis-NIR-IR spectrum of at least one of the article's base material or a laser absorption additive incorporated into the article. For example, pulse lasers utilizing 355 nm (UV) may be absorbed by $TiO_2$ added to the article, 532 nm (Green) may be absorbed by precious metal nanoparticles like gold, silver and copper. Other laser wavelengths such as 1030 nm-1064 nm or 9-12 μm (Infrared) may be absorbed by PET which may be the base material of the article. Other pairings of laser wavelengths with base materials or laser absorption additives for the article exist and are contemplated herein.

Laser Marking

The articles of the present invention are typically marked by the process of foaming, carbonization, ablation, etching, reduction, oxidation, and/or phase change. The term foaming means a process whereby the laser beam melts and vaporizes a portion of material which creates gas bubbles that become trapped within the molten resin and reflect the light diffusely when cooled. Foaming will generally produce lighter markings in the areas the laser has marked, and this method is most commonly used for dark materials such as plastics or translucent materials. The term "translucent" as used herein means the material, layer, article, or portion of the article being measured has total luminous transmittance of greater than 0% and less than or equal to 90%. The term "opaque" as used herein means the material, layer, article, or portion of the article being measured has total luminous transmittance of about 0%. The total luminous transmittance is measured in accordance with ASTM D1003.

Carbonization based marking is a process that produces strong dark contrasts on bright surfaces and is commonly used on carbon-containing polymers or bio-polymers or natural materials such as such as leather and wood and pulp-based materials. When carbonizing a material, the laser heats up the surface of the material (generally to a minimum 100° C.) emitting oxygen, hydrogen, or a combination of decomposition products. Carbonizing generally leads to dark marks with higher carbon content versus the original material, making it a good choice for lighter colored articles, while the contrast is rather minimally shown on darker materials.

Reduction and oxidation involve the laser energy changing the oxidation state of at least one of the article's components such as a laser absorption additive or opacifying pigment, resulting in a discoloration or color change that is viewed as a mark. For instance, without being bound by theory, the energy imparted from a UV laser can promote the reduction of $TiO_2$ to form a titanium sub-oxide where the oxidation state of titanium has been reduced to less than +4 and whereby this reduction results in a color change from white/colorless to blue, dark blue to black.

There are additional methods of marking an article. For example, annealing is a unique laser process available for metals and other materials. The energy from the laser beam creates an oxidation process below the surface of the material, which results in a change of color on the material surface.

Staining is another marking process achievable as the result of the chemical reaction created on materials when the energy of a laser beam is applied. Variations in color shades will depend on the compositions of the materials being stained. For example, lighter colored plastic materials can often discolor during the laser etching process, resulting in dark marking from the soot particles produced.

Laser engraving is another process that includes removing material as the workpiece surface is melted and evaporated by the laser beam, which produces an impression in the surface being engraved. Removing material is also sometimes referred to as etching or ablating. Laser etching is a process where the laser beam removes the top-most surface of a substrate or coating that was previously applied to the article's substrate. A contrast is produced as a result of the different colors of topcoat and substrate or different topography and texture of the etched region versus the adjacent region. Common materials that are laser marked by way of removing of material include anodized aluminum, coated metals, foils and films, or laminates. The term "etch" as used herein as a noun, refers to the cavity formed when material is removed from a surface. As a verb, the terms "etch" and "etching" refers to the act of removing material from a surface. Etching can be performed mechanically, chemically and thermally (e.g. laser). Although there is no specific limitation on the maximum or minimum depth of an etch, etching depths are typically in the range of about 0.01 mm to about 2.0 mm, including any depth within the range, such as for example, 0.010 mm, 0.075 mm, 0.100 mm, 0.200 mm, 0.300 mm, 0.400 mm, 0.500 mm, 1.0 mm, 1.5 mm and others.

Bleaching or photobleaching (sometimes termed fading) is the photochemical alteration of a chromophore (such as in a pigment or dye) or fluorophore molecule such that its inherent color is permanently lost and/or is unable to fluoresce. This is caused by cleaving of covalent bonds or non-specific reactions between the chromophore/fluorophore and surrounding molecules and can also be affected with laser-marking.

Spot-size is an important parameter of the laser marking of the present invention and relates to the focused area where the laser beam contacts the article. "Spot size" is the diameter of a round spot. The spots are round, but it is possible to achieve elliptical spots by control of the laser beam optics relative to the article. The spot size can be modified by focusing or de-focusing the laser beam, but the "fluence" (=energy per unit area) within the spot decreases as the spot is enlarged or de-focused. Theoretically, the minimum spot-size achievable with any laser is the wavelength of the laser itself. As a practical matter, the minimum spot size achievable with pulse lasers is ~7-20 μm. The spot sizes of the laser markings of the present invention can be in the range of from about 10 μm to about 150 μm, preferably from about 20 μm to about 100 μm, more preferably from about 30 μm to about 80 μm, and even more preferably from about 40 μm to about 60 μm. As discussed in the Background of the Invention, the spot sizes for conventional laser-markings for date codes (for example using CO2 lasers) and the like are a minimum of 250 μm and can exceed 800 μm. Another way to think about spot size in a marking context is the size of the paintbrush an artist is using to paint. If you want very fine detail, then smaller spots sizes would be utilized. Larger areas to be covered may prefer larger spots sizes.

However, laser marking mechanisms require a minimum fluence to achieve the desired mark so balancing pulse energy, pulse duration, pulse overlap and spot size are critical.

Further, there is a region around the laser-contact spot which may also be heated in the course of the marking, though little or no material would be marked. This "heat-effected zone" can still yield effects such as crystallization which can impact the appearance and/or performance of the target material. Short pulse lasers (e.g. nano-second lasers) have some heat effected zone, although substantially less than micro-second pulsed or CW type lasers, (e.g. CO2, longer pulse IR lasers, etc.). Pico and Femto second lasers are often termed "ultra-short pulse" and have very little to no heat effected zone. This capability is helpful to control the thermal effects of the marking.

Geometry of the mark spacing is a key contributor to the cycle time and fluence (or energy per unit area) provided to an article. For example, the spacing between marks may be such that the marks do not overlap at all and have 0% overlap. At 0% overlap, each individual laser pulse is responsible for the energy provided to mark the article. If the laser does not have sufficient pulse energy or peak power to achieve a desired mark, then one can decrease the pulse spacing to the point where the spots overlap in either one or both the X and Y-directions; overlapping the spots includes providing more than one laser pulse to the area of the article in which the spots overlap which provides higher fluence or energy per unit area to that portion of the article. Additionally, pulse spacing is a key lever for cycle time. If a laser has a fixed repetition rate or pulse frequency, then to achieve the lowest process-time (also called cycle-time) one would want to spread the pulses out as much as possible while still achieving the desired mark type and mark contrast. In one embodiment of the present invention, the pulses are non-overlapping.

Pulse Duration is the length of time a pulse remains continuously above half its maximum value. The shorter the pulse, the higher the peak power can be created with a common average power. This is because average power=pulse energy (J)*rep rate (Hz or 1/sec). Peak power is equal to pulse energy divided by pulse duration. Therefore, when pulse duration gets significantly smaller, the resulting peak pulse power is significantly higher. This peak power enables improved carbonization, foaming, oxidation, reduction, etc. on the targets being marked. Short pulse lasers take advantage of this phenomenon to mark articles and enable marking mechanisms typically not found in longer pulse lasers.

Modifying the power/fluence output of the laser in creating the laser mark can also be manipulated during marking to create grayscale, also known as dithering. Such a process is a known aspect of the raster-process of laser-marking. Without being bound by theory, it is believed that such dithering during laser-marking also increases process-time in that each laser pulse must be signaled to emit a different power/fluence. In one embodiment of the present invention, the laser pulses are of a constant power. The constant power may be maintained while the laser is marking within an entire row or even as the laser marks among rows over the course of the entire marked pattern.

Grid

As used herein a "grid" or a "bitmap grid" is taken to mean a regular periodic array of locations that may include the plurality of marks. The periodicity of the array includes periodicity in both the X and Y-directions. The plurality of marks within the grid may or may not be present at each of the locations within the grid. That is to say, a mark may be formed at a location within the grid or may be absent at the location (i.e. a void). As mentioned, the lasing apparatus sweeps the laser beam across the article while the laser pulses are either emitted from the laser or no pulse is emitted. A marked location occurs when the laser emits a pulse to a given location and an unmarked location results when the laser does not emit a pulse to a given location. The laser beam may be swept across the article at a constant velocity while the repetition rate of the laser is constant, so the periodicity of locations will be regular (i.e. the X-distance) in the direction in which the laser beam is swept across the article (i.e. the X-direction) even though the spacing of marked locations may not be equal, given the possibility of unmarked locations. In the event of unmarked locations, the distance between any marked locations along the same direction (ie. in the X-direction) may be an integer (ie. 2×, 3× or larger) of the smallest distance measured between marks in that direction.

The laser beam may be swept across the article in subsequent rows. The laser beam may be swept from left-to-right or from right-to-left and may sweep in the same direction as it is moved from row to row (e.g. like the carriage-return on a typewriter, as in a raster process) or may be swept in alternating directions as it moves from row to row. A key contributor to reducing cycle-time includes sweeping the laser beam in alternating directions as it moves from row to row. The rows may be generally parallel to one another. The distance between adjacent rows is the Y-distance. The locations in adjacent rows may lie directly above/below one another or may be offset relative to one another. It is appreciated that an offset that is equal to the X-distance results in a realignment of the locations between rows.

Those skilled the art will appreciate that the size of a printed, or in this case marked, alphanumeric character is measured by its font. The smallest font generally accepted as readable by a consumer on a marked article is about 6 pt. Font size can increase to very large sizes, but when marking a face of a consumer package, for example, fonts in excess of 20 are impractical as a few characters can fill an entire package.

As previously discussed, the laser marks may be non-overlapping to reduce the time required to mark a given pattern (i.e. "time-to-mark"). Time to mark can be further reduced by spacing-out the marks in either or both of the X- and/or Y-directions, however, this increased spacing can lead to poor legibility of any alphanumeric characters comprising the predetermined pattern. For example, increasing the X-distance allows for a faster surface velocity of the laser beam across the surface of the article when marking a given row (at a constant repetition-rate). Increasing the Y-distance allows for fewer turnarounds in the course of marking a given predetermined pattern.

It has surprisingly been found that, for certain predetermined patterns, increasing the Y-distance (fewer turnarounds) may have a greater impact on reducing time to mark than increasing the X-distance (faster surface velocity). While conventional raster marking processes include equal X- and Y-spacings, the present invention may include a Y-distance that is greater than the X-distance It has further been found that legibility of alphanumeric characters marked by the constant velocity (CV) bitmap process of the present invention can depend on the X- and Y-spacing as a function of the font-size of the character(s). The X-distance is preferably in the range of from about 0.005 mm to about 0.500 mm; more preferably from about 0.010 mm to about 0.100 mm; and even more preferably from about 0.040 to about 0.075 mm. The Y-distance is preferably in the range of from about 0.010 mm to about 2.0 mm; more preferably from about 0.050 mm to about 0.150 mm; and even more preferably from about 0.060 mm to about 0.075 mm.

When a predetermined alphanumeric character has a font size within the range of 6 pt to 10 pt, the Y-distance may be at least 1.2, preferably 1.5, more preferably 1.7, and even more preferably 2 times the X-distance. When the predetermined alphanumeric feature has a font size within the range of 11 pt to 16 pt the Y-distance is at least 2, preferably 2.5, more preferably 3, and even more preferably 4 times the X-distance.

Figure 3:
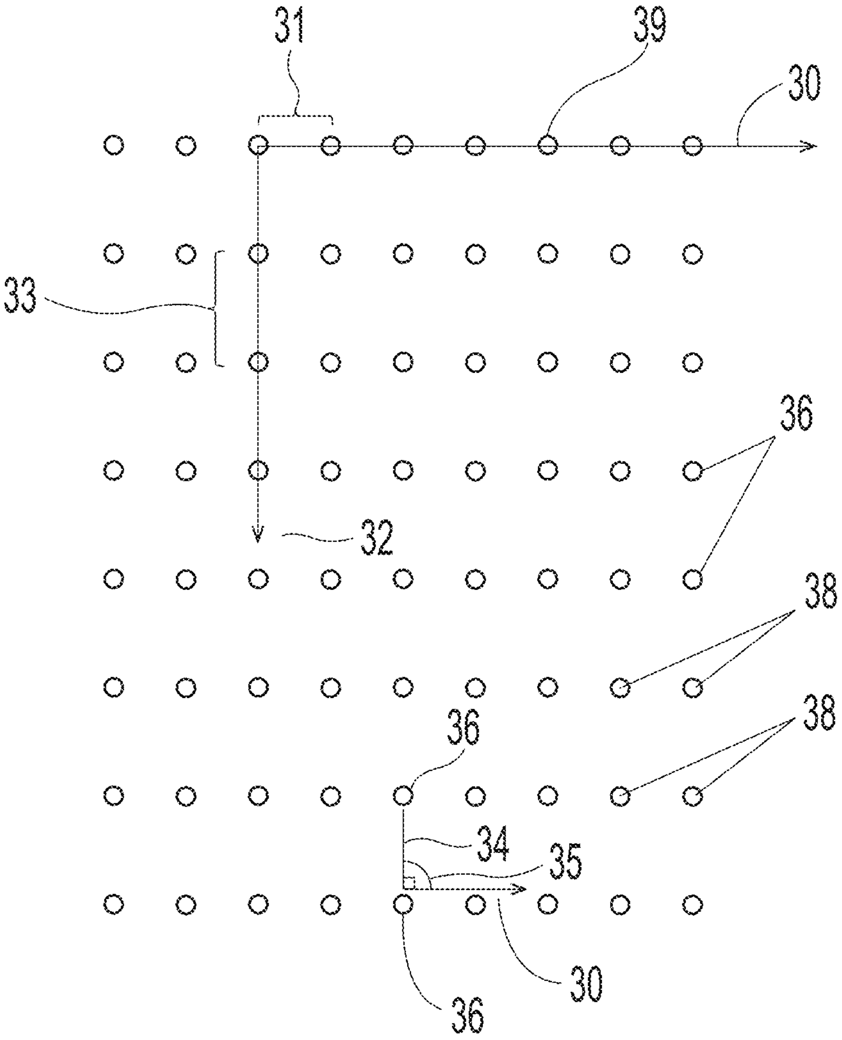
FIG. 3 is a grid according to the present disclosure wherein the locations in adjacent parallel rows are stacked.
Figure 4:
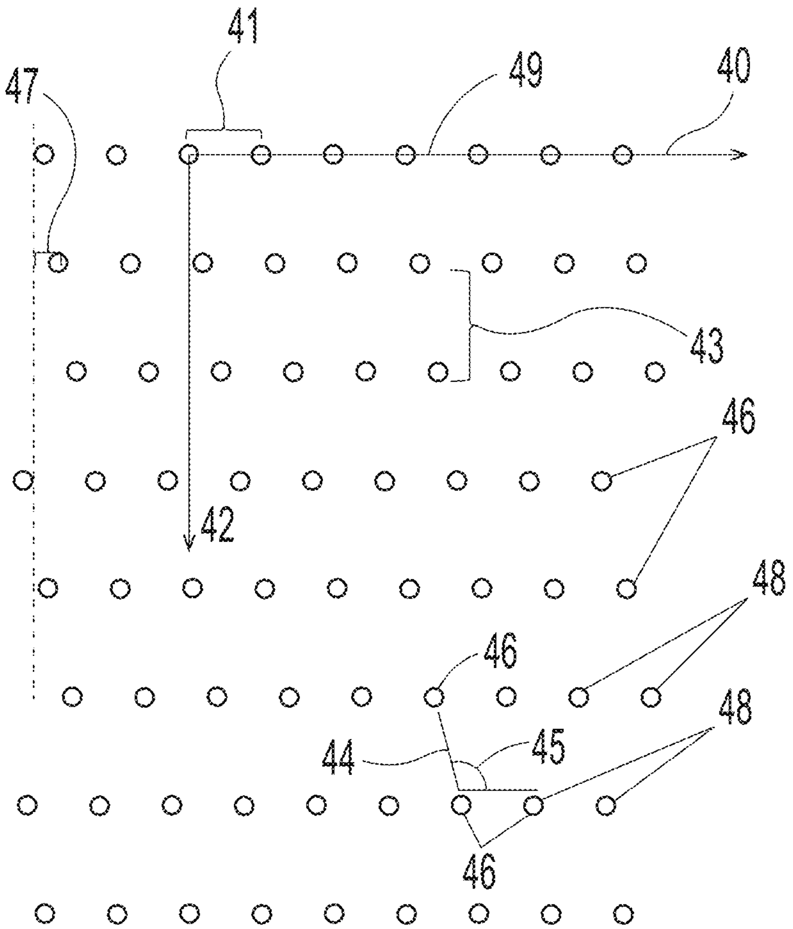
FIG. 4 is a grid according to the present disclosure wherein the locations in adjacent parallel rows are offset.
Figure 5:
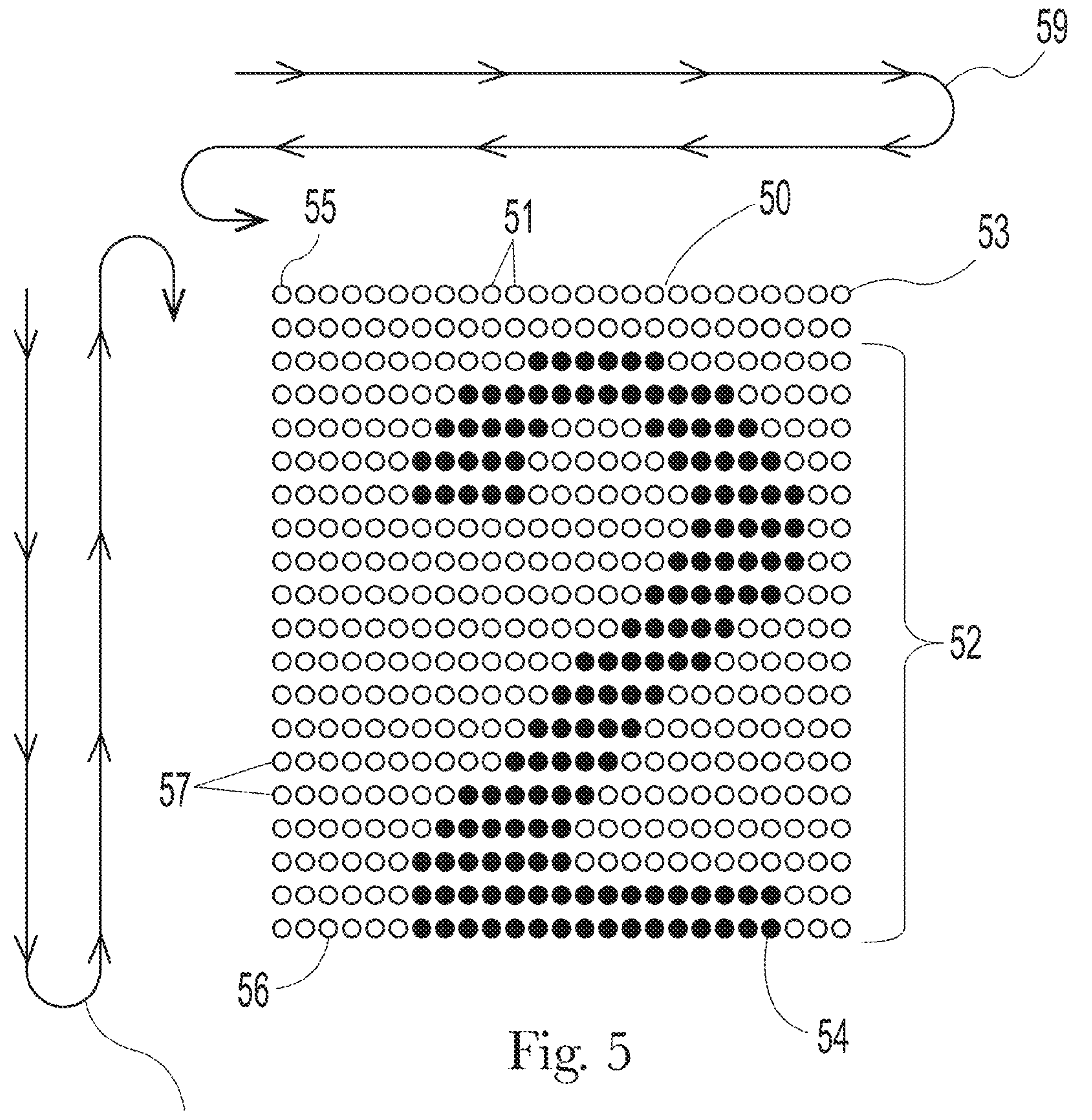
FIG. 5 is an alphanumeric character marked in a grid pattern in accordance with the present invention.

FIGS. 3, 4, and 5 all show various depictions of grids according to the present invention. More specifically, FIG. 3 is a grid 39 according to the present invention illustrating the X-direction 30, Y-direction 32, X-distance 31 and Y-distance 33. Potential marking locations 36 are depicted by the empty circles making up the grid. Further, in FIG. 3 the locations 36 among parallel rows 38 are "stacked" when the angle 35 between locations in adjacent row 34 drawn in the Y-direction between two potential marking locations and the X-direction 30 is approximately 90 degrees. In other words, if one uses vectors to connect neighboring marks from the array to form a parallelogram (i.e. unit cell), when the interior angles of the parallelogram are approximately 90 degrees, the locations are stacked. When the interior angles of the parallelograms differ from 90 degree (i.e. 120 & 60 degrees), the locations are offset. X-distance is measured from the center of one location to the center of an adjacent location in the X-direction.

Those skilled in the art will appreciate that the unit cell of a grid has four symmetrical axes horizontal, vertical, and two diagonals. The laser marking discussed herein can occur along any of those four axes. The vertical and horizontal directions shown in FIG. 5 are described for simplicity. FIG. 5 could be rotated 45 degrees and then the diagonals become vertical and horizontal. Again, the laser marking occurs across one row, then the laser moves up or down to the row above or below, and marks in the opposite direction as shown in FIG. 5.

FIG. 4 is another grid 49 according to the present invention showing an offset 44, having an offset distance 47 between adjacent parallel rows 48. Offset 44 is defined by angle 45 between locations 46 in one row 48 and the nearest location 46 in an adjacent row 48, wherein an offset 44 exists when angle 45 is greater than or less than 90 degrees. FIG. 4 further shows X-direction 40, X-distance 41, Y-direction 42, and Y-distance 43.

FIG. 5 shows an alphanumeric character 52 marked on grid 50. The alphanumeric character is the number "2" and is marked by laser marked locations 54, which are in contrast to unmarked locations 56. When multiple alphanumeric characters are printed, for example, a word, a sentence or a paragraph, the characters sharing the same line of text will also share the same horizontal rows 53 of laser markings. That is, the laser apparatus will go across one row, marking locations as needed for an individual alphanumeric character, then leave the necessary number of unmarked locations between characters, to form a row with markings associated with a plurality of characters in that row. By this method words, sentences, and paragraphs can be marked and be clearly legible to a consumer or machine.

Horizontal rows 53 and vertical columns 55 define grid 50. The distance between marked or unmarked locations (54 or 56) in horizontal row 53 defines X-distance 51. Moreover, the distance between marked or unmarked locations (54 or 56) in vertical column 55 define Y-distance 57. It is important to note that X-distance 51 and Y-distance 57 are defined with respect to the horizontal (53) and vertical (55) orientations, respectively, of the marked indicia, in this case the number "2". But the marked locations 54 can be marked in the horizontal direction 59 or the vertical direction 58. More specifically, when marking in the horizontal direction 59, the laser moves across a horizontal row 53 either marking or leaving unmarked each location (54 and 56, respectively). Then the laser moves down or up one Y-distance and begins traveling across another row above or below the row previously marked. Likewise, when marking in the vertical direction 58 the laser moves up or down a vertical column 55 either marking or leaving unmarked each location (54 and 56, respectively). Then the laser moves across one X-distance and begins traveling up or down a vertical column adjacent the vertical column previously marked.

The aspect ratio of a number or letter is the ratio of its height to its width. The aspect ratio of the number "2" shown in FIG. 5 is greater than 1 because its height is greater than its width. One can easily see that marking the number "2" in the vertical direction 58 requires fewer turn arounds than marking in the horizontal direction 59. Thus, marking this indicia may be faster when sweeping the laser-beam while marking in the vertical direction 58. Many considerations will be taken into effect when deciding to mark in the horizontal or the vertical directions. But the X-distance 51 and the Y-distance 57 when considering the relative spacings and the font size of the alphanumeric characters will always be defined with respect to the horizontal and vertical directions, respectively, with respect to the indica being marked.

The periodicity of the locations comprising the grid includes periodicity in the X-direction and periodicity in the Y-direction. The X-direction and Y-direction may be generally orthogonal to one another. As depicted in FIGS. 3 and 4, the grids 39 and 49, respectively, may take the form of equally spaced locations along successive parallel rows. The direction parallel to the successive parallel rows is taken as the X-direction (30, 40) and the direction generally perpendicular to the X-direction is taken as the Y-direction (32, 42). The spacing between adjacent locations along any of the parallel rows (e.g. in the X-direction) is taken as the X-distance (31, 41), and the distance between adjacent parallel rows is taken as the Y-distance (33, 43).

The grid 39 may be a stacked grid as depicted in FIG. 3. In a stacked grid, the locations where the marks may be applied along a first the X-axis are directly above the locations along a second X-axis immediately below the first X-axis. Said another way, the angle 35 formed between the row-segment connecting a first location along the first X-axis with an adjacent location along the first X-axis and the row-segment connecting the first location with its nearest location along the second X-axis is 90°. In a stacked grid, the spacing between adjacent locations along the X-axis is equal to the X-distance 31 and the shortest spacing between adjacent locations between adjacent X-axes is the Y-distance 33.

The grid may be an offset grid as depicted in FIG. 4. In an offset grid 49, the locations where the marks may be applied along a first X-axis are not directly above the locations along a second X-axis immediately below the first X-axis. Said another way, the angle 45 formed between the row-segment connecting a first location along the first X-axis with an adjacent location along the first X-axis and the row-segment connecting the first location with its nearest location along the second X-axis is greater than or less than 90°.

Figure 6B:
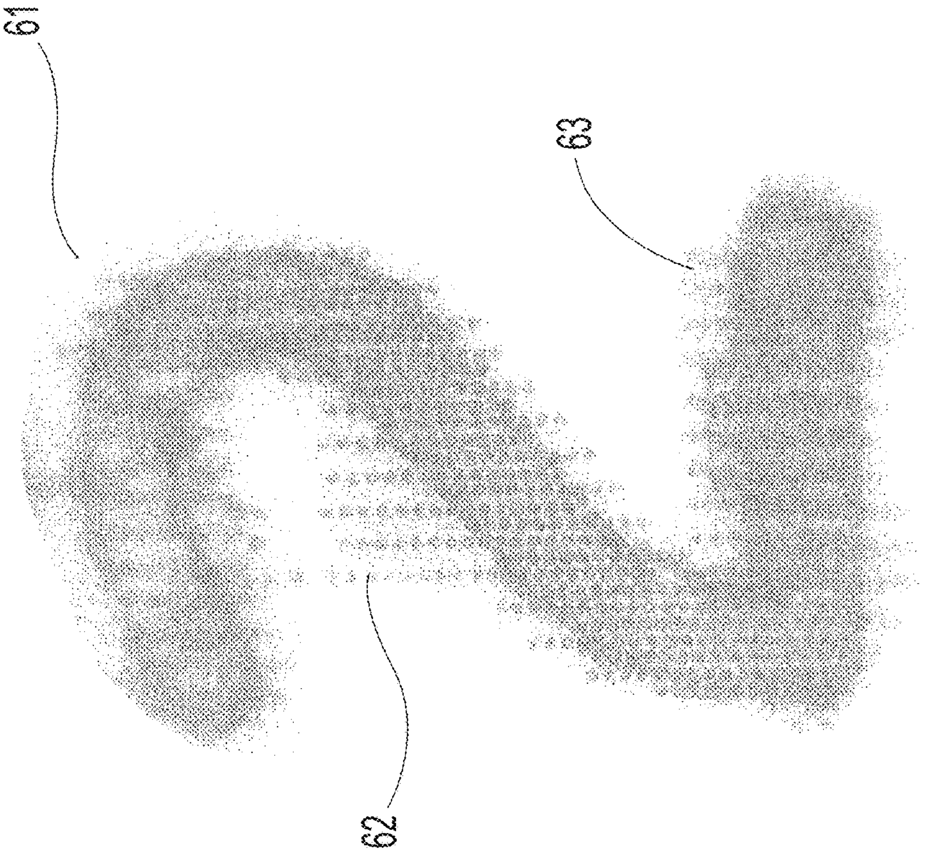
FIG. 6B is an alphanumeric character in a grid pattern marked in accordance with a prior art process.

Those skilled in the art will appreciate that the X-direction and Y-direction are somewhat arbitrarily chosen relative to the predetermined pattern. For example, FIG. 6B depicts an example of a "2" made by laser marking wherein the X-direction is vertical with respect to the marked "2" 61. Those skilled in the art will appreciate that the X-direction could just as easily been horizontal with respect to the marked "2" 61.

Those skilled in the art will appreciate that the grid (e.g. 39 and 49) and the regular spacing between adjacent locations assumes a planar surface of the article. Where the article surface is curved, the spacings may vary with the curvature of the surface.

The X-distance may be consistent among all the parallel rows comprising the grid. That is to say that the X-distance does not change along the X-direction of a given row, nor does it change among the rows of the grid comprising the predetermined pattern. Alternately, the predetermined pattern may include multiple regions where the X-spacing within each region is consistent but different between the regions. For example, one X-distance may be used consistently when marking alphanumeric characters and a different X-distance may be used when marking machine-readable codes such as UPC codes. Similarly, the Y-distance may not change within the pre-determined pattern or may vary between regions within the predetermined pattern. The surface velocity of the laser beam and/or the marking direction (i.e. up/down or side-to-side) may also be different between the regions. For example, it is notable that laser-marked articles using a vector marking process (i.e. versus the CV-bitmap marking process of the present invention) generally exhibit variable-spacing of locations/marks along any of their marked directions as the laser speeds-up (causing marks to be spaced further apart) and/or slows-down (causing marks to be spaced closer together) along the course of marking the article. The laser marking of the present invention is typically done at constant speed when the laser is marking. The movement of the laser beam stops after the end of one row along the X-direction, moves up or down to the next row in the Y-direction, and then begins marking the new row also at a constant speed. This speed may also be consistent throughout the marking of the predetermined pattern. Articles marked with the CV-bitmap grid marking process can be distinguished from articles marked with a vector marking process by the regular periodicity of marks and often by the absence of outlines or "borders" that define the marked area, see for example FIG. 6B border 63.

Figure 6A:
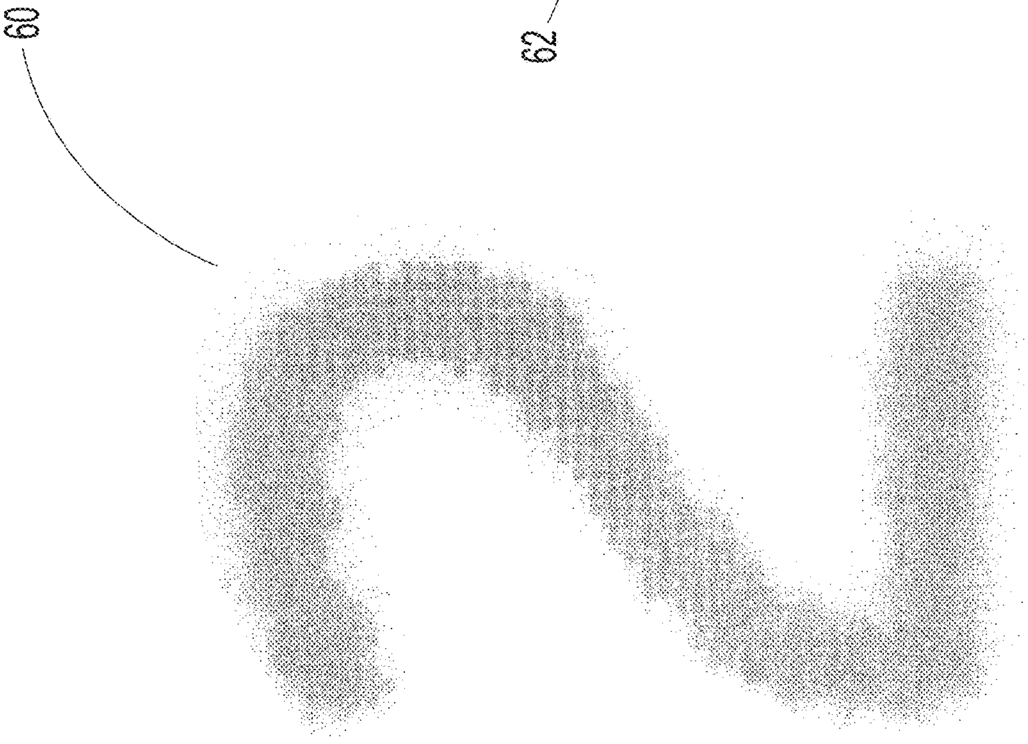
FIG. 6A is an alphanumeric character in a grid pattern marked in accordance with the present invention.

FIGS. 6A and 6B illustrate the difference between laser marking via bitmap grid marking with the inventive CV-bitmap process 6A, and the prior vector marking process 6B. in both cases an alphanumeric character 60 and 61 (i.e the number "2") is marked with a laser. The alphanumeric character 60 is substantially better defined with clean, crisp edges, and very few stray markings. FIG. 6B stands in stark contrast, with largely undefined edges and a substantial number of stray markings 62 outside the border of the alphanumeric character 61. Both characters 60 and 61 were marked in approximately the same amount of time.

Laser Marking Rate Improvement

As discussed, the present invention can laser mark articles faster and with more precision than prior processes. Existing raster processes are very slow, but relatively accurate, while the vector laser marking processes are faster and accurate at low speeds but very sloppy at high speeds resulting in unclear markings that are hard to read by consumers or machines. Raster and vector are different graphic file types that require different modes of laser processing. The main differences between modes required to laser process each type involve the movement of the galvos, or laser beam steering, and in the parameters used.

The vector path typically is slower for images because of the multiple fixed short start and stop points that require the galvo set to spend time accelerating to a user set maximum velocity (determined by the pulse spacing multiplied by the repetition rate) and the length of the vector distance. Lengthy vector distances allow the vector lasing apparatus to reach its maximum velocity, while shorter vector distances have the lasing apparatus constantly accelerating and decelerating and never reaching the maximum velocity, resulting in longer marking cycle times.

The vector process is also less accurate than the CV-bitmap process at high speeds, due to the acceleration/de-acceleration of the galvos steering the laser beam. Specifically, the location of each laser mark must be communicated from a computer driven software to the laser marking apparatus and such communication must be updated during the marking of the predetermined pattern, for example, as the laser beam traverses a given row. Typical update frequencies for this communication are ~10 μs, so a laser outputting pulses with a repetition rate of 100 kHz would allow for an update in the communication for each individual location in the grid. This is also true of raster laser marking processes which may further include variation of the pulse power for each pulse as a means of achieving grayscale (e.g. dithering). As the velocity of the laser beam across the surface of the article increases, repetition rates of greater than 100 kHz are required to achieve the desired X-spacings within the rows, and each update from the software must now communicate the location of multiple laser marks (or voids/non-marks). While the calculations can be performed nearly instantaneously, it is believed that in the extremely fast time-domains of high-speed laser marking, the galvos can not respond as quickly, and the accelerate/de-accelerate profile of the vector process results in a significant number of misplaced marks within a given row, versus the constant velocity profile of the present invention.

FIG. 6B depicts the effect of running a vector-type process at high speed when marking text involving alphanumeric characters and the misplacement of marks within a row. The figure shows many rows displaced from one another where the marking either initiated too early or too late, so that the outline of the alphanumeric character is jagged and the overall appearance is blurred and potentially illegible (e.g. one cannot distinguish an "8" from an "0").

In contrast, the process and resulting patterns of the present invention can be created by a constant velocity (CV) bitmap path. The CV-bitmap laser marking process allows for increased speed and increased precision because there are no start and stop points within a row, but rather a user defined maximum velocity (again, the pulse spacing multiplied by the repetition rate) that is constant while applying pulses or marking. Moreover, the lasing apparatuses of the present invention can increase speed when not marking over relatively long distance (relative to the X-distance). For example, if there is a distance of 2-3 mm (or more) between markings in one row of marks, the lasing apparatus can accelerate without losing accuracy; otherwise the laser beam is moved at a constant velocity while pulsing. This is yet another reason the marking systems of this invention are faster and more accurate than prior devices.

Smaller galvos sets (e.g. including lower mass mirrors) enable higher acceleration to reach this user defined maximum velocity. One can tune these galvos to high acceleration values that allow the mirror to reach its desired angular velocity in a lower amount of time. Interestingly, these values can be tuned specifically for bitmap processing at higher values vs. vector processing. Additionally, in vector laser software there is a maximum marking velocity limitation set such that the laser marks are close to their desired commanded position. As one increases the maximum velocity threshold, the laser pulses have more error vs. their desired position in vector processing. It is noted that in CV-bitmap marking mode, since the velocity (e.g. both the angular velocity of the mirrors and the surface velocity of the laser beam) is constant during the marking process, one can increase the maximum velocity threshold significantly achieving an overall lower marking cycle time vs. vector, and still maintain pulses in their predetermined position.

The angular velocity of the galvo sets is important to job cycle time as it relates directly to the laser beam's surface velocity across the article. The surface velocity of the laser beam is set by the angular velocity of the galvo/mirror pairs and the focal length of the lasing apparatus.

$$\text{surface velocity} = \text{galvo angular velocity(rad/sec)} * \text{focal length(mm)}$$

The surface velocity when producing laser marks within a given row is primarily controlled by the X-galvo/mirror set. Job cycle time can be more dependent on the laser surface velocity in the X-direction than in the Y-direction, and the X-galvo/mirror set may be more responsive than the Y-galvo/mirror set. For example, the mirror on the X-galvo/mirror set may be smaller (i.e. lower mass, smaller mirror size, lower inertia, higher acceleration motor capability)

The surface velocity of the laser beam across the surface of the article in the current CV-bitmap process are much faster than those achievable with currently available laser marking processes such as raster and vector marking processes. Current processes typically exemplify surface velocity on the order of 1-2 m/s or less. The CV-bitmap process of the present invention provides for surface velocities above 8 m/s, and further surface velocities equal to or greater than 10 m/s, 15 m/s, 18 m/s, 22.5 m/s, 32.5 m/s, 45 m/s, 60 m/s and even as high as 90 m/s or higher.

The sweep path of the laser beam across the surface of the article can also contribute to reduced cycle time. Conventional raster laser marking processes sweep the laser beam across the rows in either the right-to-left or left-to-right directions, also known as unidirectional, and "jumps" the laser beam back after marking each row to start the subsequent row (like a carriage return on a typewriter). In this way, subsequent rows can be easily registered (i.e. stacked) and grid-locations can be lined-up based on this consistent starting point. To eliminate the jump distance and reduce the time between each marked row, the current CV-bitmap process uses a "bi-directional" process in which marking may be done in alternating fashion in both directions (i.e. marking occurs left-to-right in a first row and right-to-left in a subsequent row).

To keep the rows of pulses lined up, the lasing apparatus may be programmed to incorporate a laser on adjust which is a delay function for each alternating row to keep the pulses lined up. For example, at ~22.5 m/sec marking velocity (i.e. surface velocity) an 8 micro sec delay is used for alternating rows. Typical bitmap laser software setups allow one to select a single pulse spacing or pitch that is common in both the X and Y directions. A similar contrast can be created for both human legible (e.g. text) and machine readable (e.g. UPC, QR codes) objects by creating different X and Y distances.

The laser on adjust is an element of the turnaround profile of the laser beam sweep path. The turnaround profile refers to the path followed by the galvo set directing the laser beam while the laser beam is turning around between rows (i.e. after marking a row left-to-right, turning around to mark a subsequent row right-ot-left). The laser is typically off (i.e. not emitting pulses) during the turnaround. The laser on adjust helps align the marks within adjacent rows. For example, when the grid is a stacked grid, the laser on adjust ensures that the marks in adjacent rows remain stacked. If an offset grid were used, then the laser on adjust would ensure that the grid remains offset, and that the amount of the offset remains relatively constant. The laser on adjust may be determined experimentally and generally varies with angular velocity of the galvo sets.

The turnaround profile of the laser beam after completing a row can also contribute to reduced cycle time. As discussed previously, the laser beam is steered by a galvo set and the ability of the galvo set to accelerate and decelerate is a known limitation to speed and accuracy of laser marking in other (e.g. vector) marking processes. The current CV-bitmap process overcomes these limitations. For example, the current CV-bitmap process does not accelerate or deaccelerate the laser beam while the laser is emitting pulses (i.e. making laser marks). Instead, the laser beam is only being accelerated/decelerated while the laser is not marking the article, such as when the laser beam is skipping multiple voids (or even entire rows) or while the laser beam is turning-around at the end of a row and prior to marking a subsequent row. The turnaround profile may be symmetric or asymmetric. Given the high speeds at which the laser beam sweeps across the surface of the article, an asymmetric turnaround profile may be preferred.

As mentioned previously, the geometry of the mark spacing is a key contributor to the cycle time. As discussed, spreading out the locations within the grid (i.e. increasing the X- and Y-distances) can result in decreasing cycle time. Within the rows, the X-distance contributes to cycle time in that the laser surface velocity is determined by the laser repetition rate and the X-distance. Increasing the Y-distance improves cycle time by reducing the number of turnarounds that the galvo sets have to make (i.e. the number of rows comprising the predetermined feature) which may take up to 30-70% of the total cycle time at high speeds. For example, one can make the X distance smaller and the Y distance larger to get a similar looking image at a reduced overall cycle time. It has further been found that reducing the X-distance concurrently with increasing the Y-distance provides for faster cycle time and improved legibility of the marked feature.

As discussed previously, the X-distance and the Y-distance and their ratio can contribute to laser marking legible small font text or images at high speed (i.e. low cycle time). X- and Y-spacing can also be important when marking images such as graphics, particularly when the image(s) include grayscale. Whereas the known process of raster marking creates grayscale by varying the energies of individual laser pulses, the CV-bitmap process instead runs too fast and does not vary these pulse energies individually and achieves grayscale by spacing full energy pulses in different patterns to make gray scale appearance.

The choice of the orientation of the marking direction can affect job cycle time, particularly when marking features with a high (or low) aspect ratio. The aspect ratio of the feature is generally taken as the ratio of the height to the width of the feature. Where the height and the width are nearly similar, the aspect ratio is close to 1 and the impact (to job cycle time) of choosing the marking direction relative to the dimensions of the feature may be minimal. However, for features that have a high aspect ratio (e.g. height>>width) or low aspect ratio (e.g. width>>height), job cycle time can be reduced by selecting the marking direction relative to the dimensions of the feature. For example, the marking direction may be chosen to be generally parallel to the longer dimension of the feature (i.e. the major axis) or the marking direction may be chosen to be generally parallel to the shorter dimension of the feature (i.e. the minor axis), see again FIG. 5. While there are many factors affecting job cycle time, it is believed, that corresponding the marking direction to the major axis of the feature reduces the number of turnarounds required when marking the feature, thereby reducing job cycle time.

The choice of the orientation of the marking direction can also affect job cycle time at very high surface velocity. At very high surface velocities, the turnaround time can increase to the point where it dominates the job cycle time. Selecting the marking direction to be generally parallel to the longer dimension of the feature minimizes turnarounds and can reduce job cycle time. As previously discussed, the X- and Y-distances may be different, and this difference can contribute to reduced job cycle, and any loss in clarity of the image(s) of the feature, such as alphanumeric characters, can be compensated by reducing the X-distance while increasing the Y-distance.

As previously discussed, the smallest font generally accepted as readable by a consumer on a marked article is about 6 pt. Font size can increase to very large sizes, but when marking a face of a consumer package, for example, fonts in excess of 20 are impractical as a few characters can fill an entire package. When a predetermined alphanumeric character has a font size within the range of 6 pt to 10 pt, the X-distance may be at least 1.2, preferably 1.5, more preferably 1.7, and even more preferably 2 times the Y-distance. When the predetermined alphanumeric feature has a font size within the range of 11 pt to 16 pt the X-distance is at least 2, preferably 2.5, more preferably 3, and even more preferably 4 times the Y-distance. As discussed, these ratios of the X- and Y-distances are defined with respect to the horizontal and vertical directions, respectively, with respect to the indica being marked, regardless of whether the sweep-direction of the laser beam is vertical or horizontal relative to the indicia.

In the laser marking process of the present invention, the laser source is stationary, and the laser beam is guided by the lasing apparatus including a series of lenses and mirrors which are controlled by an algorithm. The algorithm is able to read a digital image of the desired mark-pattern (e.g. from a PDF file of the desired image) and translate the image to the mark-pattern on the target. The lens/mirror system and the algorithm are provided by IPG Photonics, 50 Old Webster Road, Oxford, MA 01540, USA.

Microscopy

Numerous articles were marked according to the processes of the present invention as well as comparative articles marked with existing processes. Results of those comparisons are given in Tables 1, 2 and 3, as well as FIGS. 7 and 8. To obtain these comparative data, samples are cut from laser marked blow molded bottles using utility knife and scissors. If the cut-out sample is not suitably flat, the sample is flattened onto the microscope stage by use of tape or a frame. A stereomicroscope such as a motorized Zeiss SteREO Discovery.V20 (Carl Zeiss Microscopy, LLC, Thornwood, NY) equipped with color camera such as the Axiocam 305 (5 megapixel CMOS, Carl Zeiss Microscopy, LLC, Thornwood, NY) is used to image characters, digits and images of interest of the sample using reflected light illumination such as achieved with a LED ring light and light source such as a Cold-light source CL 6000 LED lamp (Carl Zeiss Microscopy, LLC, Thornwood, NY). A typical light intensity of 80-100% of the maximum light intensity is used. The individual laser markings that combine to form the character, digit, or images of interest are resolved using suitable magnification using an objective lens such as an Achromat S 1.5×FWD 28 mm (Carl Zeiss Microscopy, LLC, Thornwood, NY) combined with a zoom factor such that the total magnification is between 10× and 345×. By way of example, characters, digits, or images with a font size of 10 pt, the total magnification is about 40× magnification. After the digit of interest is brought into view of the camera, the character, digit, or image is brought into focus using manual skill or, preferably using the autofocus module via the user interface platform (such as Zen V2.6 Blue Edition or higher with Zen Autofocus module, Carl Zeiss Microscopy, LLC, Thornwood, NY). Prior to collecting an image of the characters, digits, or image, the imaging settings are optimized by using an auto exposure option from the user interface platform along with the lamp intensity. Images are collected in the highest resolution format possible, such as ZVI, then exported as Tiff files having resolution of about 2464×2056 pixels. Furthermore, the marked rows of the character, digit, or artwork should be nearly parallel with the horizontal borders of the image. If required, multiple images taken at higher magnification may be accurately stitched together to encompass the full area of the character, digit or image.

Image Analysis

The images from the microscope appear gray but are captured in color. The images are converted to gray scale using an NTSC protocol. A suitable image analysis software is required to perform this and several other image processing steps. Analysis functions implemented by MATLAB available from The Mathworks, Inc., Natick, MA are referenced in this method description.

The microscopy and subsequent image analysis may be pursued over one or more predetermined patterns, a portion of a predetermined pattern, or an individual image within a predetermined pattern such as a graphic or an alphanumeric character. Where the image analysis is to be performed over a portion of a predetermined pattern, prior to the analysis, the portion (such as an individual graphic or alphanumeric character) must be separated from any surrounding images, characters or artwork. A mask may be drawn around the character or image of interest in the predetermined pattern. The mask separates the character or image from other partial characters, digits, bar codes, artwork, dirt or other imperfections that may occur in the image.

The image analysis relies first on identifying the laser marks that comprise the image. The laser marks can be identified by any reasonable means. For example, by repeatedly thresholding the grayscale image from the microscopy. The start threshold is set to capture only a few pixels that fall in some of the markings. The threshold value then progressively changes, capturing an ever-increasing area of the marks. The progressive thresholding continues from the start threshold to a stop threshold. The stop threshold may be determined automatically such as by using MATLAB's "multithresh" function (i.e. Otsu's method). Progressive thresholding can be advantageous in the analysis because the area of markings may overlap and/or merge and the background may not be perfectly uniform. The direction of the threshold progression (i,e, light-to-dark or dark-to-light) can be used to identify dark markings versus a relatively light background or light marking versus a relatively dark background. In the example presented, dark marks are identified versus a relatively light background.

Connected components may then be used to identify individual marks once the area reaches a certain size. A connected-components algorithm is executed with each new threshold to group touching pixels into blobs. When a blob reaches 50% of the area for a mark, it is identified as a mark. The center coordinates of the marks are found using a centroid method as implemented in MATLAB's "regionprops" function. The centers are subsequently used (see below) to determine spacings among adjacent marks in a row (e.g. the X-distance) and spacing between adjacent rows of marks (e.g. the Y-distance).

Samples and Data

Figure 7:
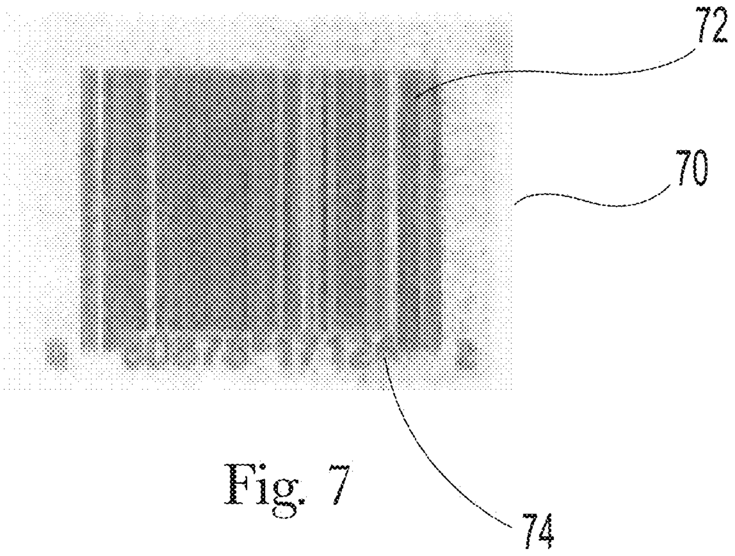
FIG. 7 is an industry standard UPC code printed by lasers and processes of the present invention.

Table 1 displays data obtained by laser marking four different articles with the same pattern, and then analyzing them using the methods described above. The marking in this case was an industry standard UPC code. Those skilled in the art will appreciate that a UPC, which must appear on all consumer purchased goods, must have clearly defined black bars and alphanumeric characters against a lighter, preferably white, background in order for a UPC scanner to read the code quickly and accurately. Said another way, UPC codes must be printed or marked with precision to be accurately read by a scanner or person. By way of example, FIG. 7 shows UPC code 70 laser marked according to the processes of the present invention. UPC code 70 is a mixture of bars 72 of varying width, and alphanumeric characters 74.

Before the present invention, vector laser marking was the fastest available laser marking system, but Table 1 clearly shows that as the speed of vector marking increases the precision of the marking decreases substantially. More specifically, vector marking was tested at a maximum gavlo angular velocity of 15.6, 350, and 1000 radians per second and compared to the CV-bitmap marking of the present invention at a maximum velocity of 1000 radians per second. The target Y-distance is provided in the first row, and the actual Y-distance for each of the n samples was measured (in mm) and then averaged. More importantly, sigma a, the standard deviation, was calculated for the n samples using a standard mathematical formula. The standard deviation is a measure of how far away the individual samples deviated from the target Y-distance. For example, if only two samples were run at a target Y-distance of 0.150, and one sample was 0.200 and the other was 0.100 their average would be exactly 0.150, the target value. But the precision would be awful. The standard deviation in this example would be a large number indicating the lack of precision for these two hypothetical samples where their average would look to be on-target.

Comparing vector marking at a galvo angular velocity of 15.6 radians per second (the first entry in Table 1) to CV-bitmap marking at 1000 radians per second (the last entry in Table 1), the average X-distance and the average Y-distance, and the corresponding standard deviations, are similar across the four target X- and Y-distances tested. When the gavlo angular velocity of the vector marking is increased to 1000 radians per second, the average X-distance and corresponding standard deviation remain reasonable, but the Y-distance standard deviation becomes unacceptable, and UPC codes are ultimately unreadable, both in terms of a machine reading the barcode and a human reading the underlying numeric characters. For the UPC code marked by the process of the present invention, both the average X-distance and standard deviation and the average Y-distance and standard deviation, even at a maximum galvo angular velocity of 1000 radian per second, are very good. Accordingly, the CV-bitmap laser-marking of the present invention provides the clear benefit of speed and precision $$s = \sqrt{\frac{\sum (x_i - \overline{x})^2}{n-1}}$$

over the prior vector marking systems.

Where S=σ=the standard deviation; n=the number of samples used; $x_i$=the individual deviations from the mean for each sample; and, x=the mean, or simple average of the samples.

TABLE 1

Marking Precision versus speed: Y Spacing
n = the number of samples tested
Y = the average Y distance for the n samples tested
σ = the standard deviation of the Y distance for the n samples tested
All Y-distances are in mm

| | VelMax (rad/sec) | Target Y-distance Y = 0.150 | Target Y-distance Y = 0.105 | Target Y-distance Y = 0.060 | Target Y-distance Y = 0.050 |
|---|---|---|---|---|---|
| Vector | 15.6 | Y = 0.154<br>σ = 0.005<br>n = 7 | Y = 0.106<br>σ = 0.006<br>n = 7 | Y = 0.057<br>σ = 0.005<br>n = 6 | Y = 0.046<br>σ = 0.005<br>n = 7 |

TABLE 1-continued

Marking Precision versus speed: Y Spacing
n = the number of samples tested
Y = the average Y distance for the n samples tested
σ = the standard deviation of the Y distance for the n samples tested
All Y-distances are in mm

| | VelMax (rad/sec) | Target Y-distance Y = 0.150 | Target Y-distance Y = 0.105 | Target Y-distance Y = 0.060 | Target Y-distance Y = 0.050 |
|---|---|---|---|---|---|
| Vector | 350 | Y = 0.150<br>σ = 0.007<br>n = 7 | Y = 0.103<br>σ = 0.010<br>n = 7 | Y = 0.056<br>σ = 0.011<br>n = 8 | Y = 0.046<br>σ = 0.012<br>n = 6 |
| Vector | 1000 | Y = 0.164<br>σ = 0.043<br>n = 7 | Y = 0.121<br>σ = 0.045<br>n = 7 | Y = 0.069<br>σ = 0.031<br>n = 6 | Y = 0.061<br>σ = 0.029<br>n = 6 |
| cv-BitMap* | 1000 | Y = 0.151<br>σ = 0.006<br>n = 7 | Y = 0.102<br>σ = 0.006<br>n = 7 | Y = 0.055<br>σ = 0.006<br>n = 9 | Y = 0.045<br>σ = 0.007<br>n = 6 |

*laser beam speed = 22.5 m/s for X (target) = 0.045 mm; laser beam speed = 25 m/s for X (target) = 0.050 mm Table 2 is another set of comparative data wherein the UPC codes were laser marked with legible precision. That is, at each speed and at each target Y and X distance, the time it took to create a machine readable UPC was measured. As is clearly shown, with each successive increase in Velocity Max, the time required to laser-mark the UPC code in a precise/readable manner actually took longer for the vector marking process

TABLE 2

Total Time to Mark (seconds)
All X and Y-distances are in mm

| | VelMax (rad/sec) | X = 0.045 Y = 0.150 | X = 0.045 Y = 0.105 | X = 0.045 Y = 0.060 | X = 0.050 Y = 0.050 |
|---|---|---|---|---|---|
| Vector | 15.6 | 2.92 | 4.15 | 7.27 | 8.72 |
| Vector | 350 | 2.32 | 3.29 | 5.77 | 6.93 |
| Vector | 1000 | 3.22 | 4.56 | 7.99 | 9.86 |
| CV-BitMap | 1000 | 0.34 | 0.40 | 0.59 | 0.66 |

Figure 8:
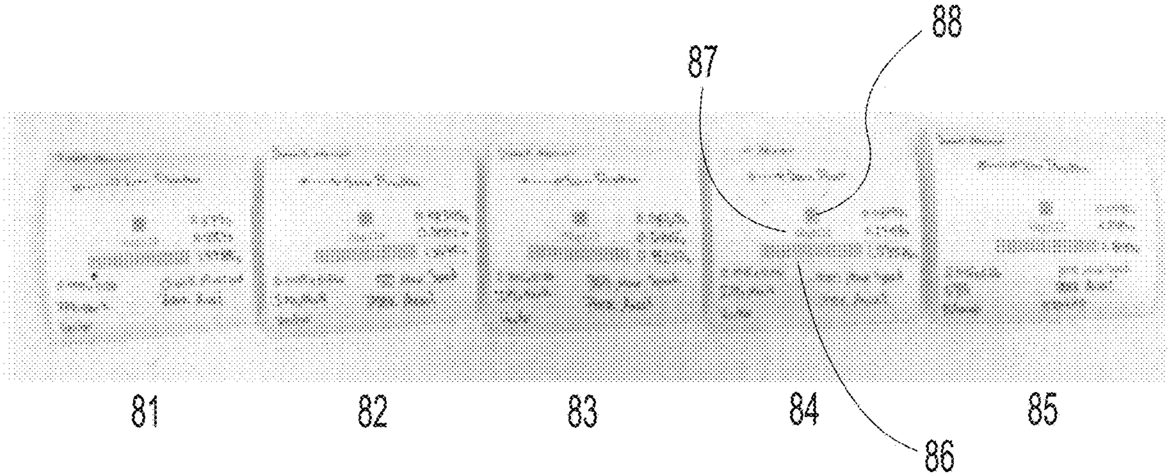
FIG. 8 shows a standardized rectangle pattern laser printed by a vector laser process of the prior art compared to the same pattern laser printed according to the present invention.

Table 3 contains data taken from the laser marked samples shown in FIG. 8. The top line of Table 3 indicates which of the five samples shown in FIG. 8 (81-85) the data corresponds to, how each sample was laser marked, and how it compares to the other samples. FIG. 8 shows 5 mm squares 88, sample text 87 (alpha numeric characters "Abg123"), and a series of 1 mm by 5 mm rectangles 86 which are spaced apart by 1 mm. The repetition rate is 500 khz using normal acceleration rate of 700,000 rad/sec$^2$. Line two of Table 3 shows how each sample was marked, line 3 is the maximum galvo angular velocity of the laser marking, and the fourth and fifth rows are a qualitative description of the results. The actual data for the marking the 5 mm squares 88, the text 87, and the 1 mm by 5 mm Standardized Rectangles 86 is shown in the remaining lines of Table 3. Once again, it is quite clear that the speed and precision of laser marking according to the CV-bitmap of the present invention is far superior to the prior vector marking systems. An f-theta lens was used with a 250 mm focal length.

TABLE 3

| FIG. 8 Dwg No. | 81 | 82 | 83 | 84 | 85 |
|---|---|---|---|---|---|
| Marking Type | Vector | Vector | Vector | Vector | Raster Bitmap |
| Max Velocity Threshold (rad/sec) | 15.6 | 50 | 350 | 1000 | 1000 |

TABLE 3-continued

| FIG. 8 Dwg No. | 81 | 82 | 83 | 84 | 85 |
|---|---|---|---|---|---|
| Cycle Time (written on each part) | Slowest | Slower | Slow | Slow | Fast (~1.5-8× faster vs vector) |
| Dot or Pulse Quality (Legibility) | Best | Better | Good | Bad | Better |
| Cycle time (s) to print a 5 mm Square 88 FIG. 8 | 0.117 | 0.083 | 0.082 | 0.088 | 0.060 |
| Vector vs. CV-Bitmap cycle time | 197% | 140% | 137% | 148% | N/A |
| Text (Abg123) 87 FIG. 8 (time, s) | 0.340 | 0.300 | 0.245 | 0.295 | 0.071 |
| Vector vs. CV-Bitmap cycle time | 476% | 421% | 343% | 413% | N/A |
| Standardized Rectangles (time, s) (1 mm × 5 mm, spaced 1 mm apart) 86 FIG. 8 | 1.494 | 1.335 | 0.993 | 1.036 | 0.185 |
| Vector vs. CV-Bitmap cycle time | 809% | 723% | 537% | 561% | N/A |

Standardized Rectangle Method

The Standardized Rectangle method is a standardized test to measure both speed and accuracy of any lasing apparatus. Simply put, any lasing apparatus that can be programmed to print 20 identical rectangles (similar to a simplified UPC code) can be tested. The details of the test are given below, but those skilled in the art will appreciate that the time it takes to print the Standardized Rectangles is important in demonstrating the benefit of this invention. The last two lines of Table 3 show examples of the times needed to print the Standardized Rectangles with four lasing apparatuses/processes available today and one lasing apparatus/process according to the present invention. The prior lasing apparatuses/processes needed from 1.5 to 1.0 seconds to print the Standardized Rectangles. The lasing apparatus/process according to the present invention needed only 0.185 second, 500%-800% faster than the prior devices.

Figure 9:
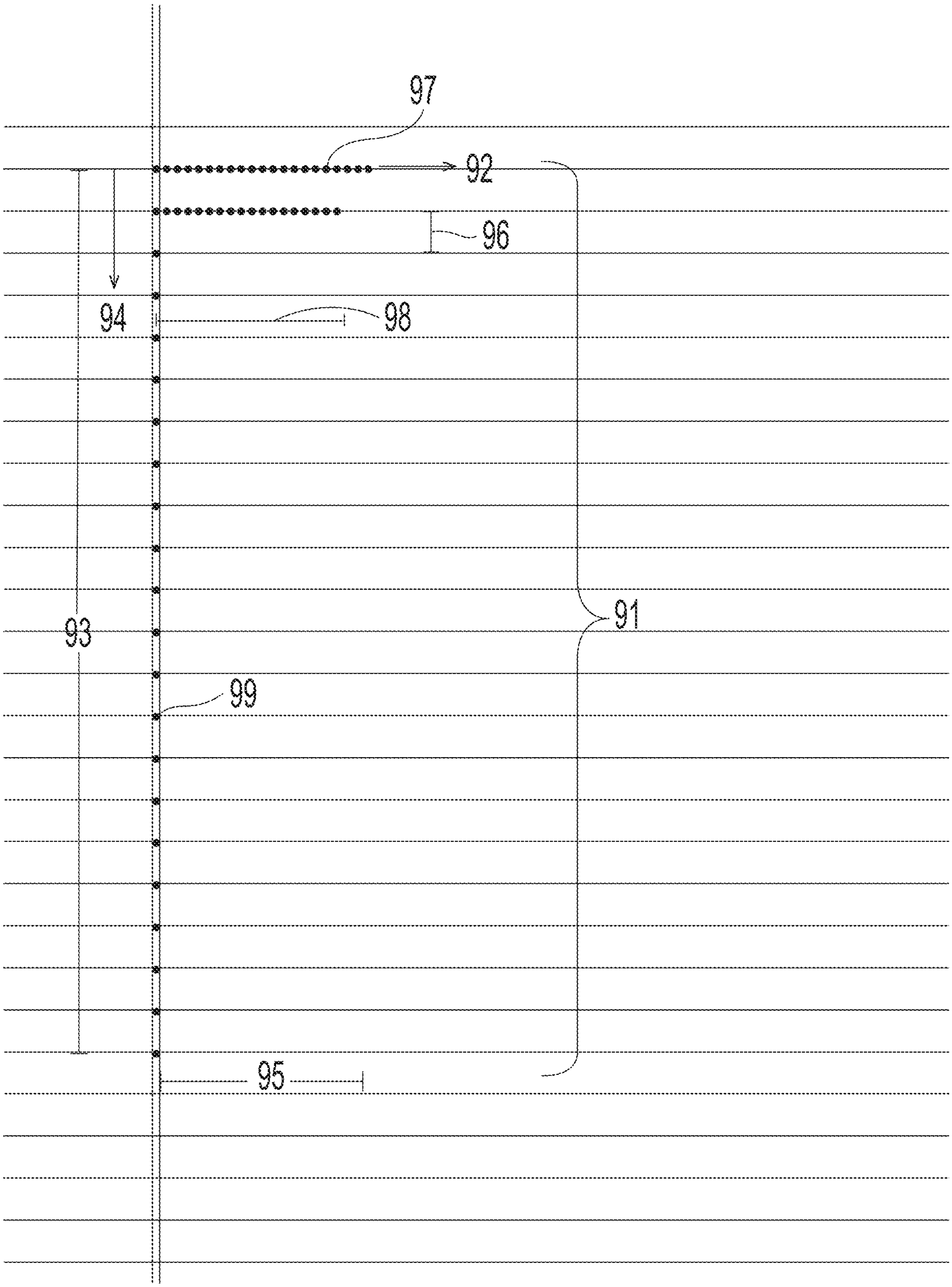
FIG. 9 is an exemplary grid of the standardized rectangle according to the present invention.

As shown in FIG. 8, the Standardized Rectangles 86, are a series of 20 identical rectangles 91, of FIG. 9, that are approximately 1 mm wide 95 by approximately 5 mm high 93 and spaced apart by about 1 mm. The rectangles width 95 must be in the range of 0.94 mm and 1.22 mm. The rectangles height 93 must be in the range of 4.8 mm to 5.00 mm. Each rectangle contains 80-84 parallel rows 97. Each row is in the X-direction 92, that is, across the 1 mm width 98. Accordingly, the Y-distance 96, the distance between rows, is in the range of 0.24 mm-0.26 mm. There are 20-24 marks 99 in each row 97. Obviously, not all the marks 99 are shown for purposes of clarity.

All percentages are weight percentages based on the weight of the composition, unless otherwise specified. All ratios are weight ratios, unless specifically stated otherwise. All numeric ranges are inclusive of narrower ranges; delineated upper and lower range limits are interchangeable to create further ranges not explicitly delineated. The number of significant digits conveys neither limitation on the indicated amounts nor on the accuracy of the measurements. All measurements are understood to be made at about 25° C. and at ambient conditions, where "ambient conditions" means conditions under about one atmosphere pressure and at about 50% relative humidity.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for marking an article with a pulsed laser, the process comprising the steps of:

providing a pulsed laser configured to produce a laser beam comprising pulses;

providing an article comprising an article surface, wherein the article comprises one or more layers of a thermoplastic resin;

using the laser beam to form a plurality of marks on the article surface in a grid pattern by at least one of foaming, ablating, etching, reducing, oxidizing, and carbonizing; and moving the laser beam while interacting with the article surface along a first row at a constant velocity while forming the plurality of marks, and wherein the constant velocity is greater than about 8 m/s.

2. The method of claim 1, wherein the laser beam moves in a bi-directional motion such that the laser beam moves across the first row in a first direction and moves across a second row in a second direction, wherein the first direction is opposite the second direction, preferably, the first and second row are adjacent.

3. The method of claim 1, wherein the grid pattern comprises a plurality of locations positioned in two or more rows, wherein the two or more rows are substantially parallel, wherein each adjacent pair of locations of the plurality of locations along any of the two or more rows is separated by an X-distance and each adjacent pair of the two or more rows is separated by a Y-distance, and wherein the Y-distance and the X-distance are different.

4. The method of claim 3, wherein each of the plurality of locations includes a mark or a void.

5. The method of claim 4, comprising moving the laser beam across each of the locations of the grid pattern, wherein the laser beam moves at the constant velocity as consecutive marks are formed on adjacent locations in the same row, and wherein the laser beam accelerates as the laser beams moves across consecutive locations having a void.

6. The method of claim 1, wherein the laser beam has a turn around acceleration profile as the laser beam moves from the first row to the second row.

7. The method of claim 1, wherein the laser beam has a repetition rate greater than about 100 kHz.

8. The method of claim 1, wherein the laser beam has a pulse energy of from about 10 μJ to about 1000 μJ.

9. The method of claim 1, wherein the laser beam has a focal length of from about 100 mm to about 1200 mm.

10. The method of claim 1, wherein the laser beam has a wavelength of from about 300 nm to about 1100 nm.

11. The method of claim 1, wherein the laser beam has a pulse duration of less than about 100 nanoseconds.

12. The method of claim 1, wherein the constant velocity is greater than about 32 m/s.

13. The method of claim 1, wherein the thermoplastic resin is selected from polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), propylene (PP), or a combination thereof.

14. A method for marking an article with a pulsed laser, the process comprising the steps of:
- providing a pulsed laser configured to produce a laser beam comprising pulses;
- providing an article comprising an article surface;
- using the laser beam to form a plurality of marks on the article surface in a grid pattern by at least one of foaming, ablating, etching, reducing, oxidizing, and carbonizing, wherein the plurality of marks are formed by individual pulses and are non-overlapping; and
- moving the laser beam while interacting with the article surface along a first row at a constant velocity while forming the plurality of marks, and wherein the constant velocity is greater than about 8 m/s.

15. The method of claim 14, wherein the grid pattern comprises a plurality of locations positioned in two or more rows, wherein the two or more rows are substantially parallel, wherein each adjacent pair of locations of the plurality of locations along any of the two or more rows is separated by an X-distance and each adjacent pair of the two or more rows is separated by a Y-distance, and wherein the Y-distance and the X-distance are different.

16. The method of claim 15, wherein each of the plurality of locations includes a mark or a void.

17. The method of claim 16, comprising moving the laser beam across each of the locations of the grid pattern, wherein the laser beam moves at the constant velocity as consecutive marks are formed on adjacent locations in the same row, and wherein the laser beam accelerates as the laser beams moves across consecutive locations having a void.

18. The method of claim 14, wherein the laser beam has a turn around acceleration profile as the laser beam moves from the first row to the second row.

19. The method of claim 14, wherein the article comprises one or more layers of a thermoplastic resin selected from polyethylene terephthalate (PET), polyethylene terephthalate glycol (PETG), polystyrene (PS), polycarbonate (PC), polyvinylchloride (PVC), polyethylene naphthalate (PEN), polycyclohexylenedimethylene terephthalate (PCT), glycol-modified PCT copolymer (PCTG), copolyester of cyclohexanedimethanol and terephthalic acid (PCTA), polybutylene terephthalate (PBCT), acrylonitrile styrene (AS), styrene butadiene copolymer (SBC), low-density polyethylene (LDPE), linear low-density polyethylene (LLPDE), high-density polyethylene (HDPE), propylene (PP), or a combination thereof.

20. A method for marking an article with a pulsed laser, the process comprising the steps of:
- providing a pulsed laser configured to produce a laser beam comprising pulses;
- providing an article comprising an article surface, wherein the article comprises one or more layers of a thermoplastic resin;
- using the laser beam to form a plurality of marks on the article surface in a grid pattern by at least one of foaming, ablating, etching, reducing, oxidizing, and carbonizing; and
- moving the laser beam while interacting with the article surface along a first row at a constant velocity while forming the plurality of marks, and wherein the constant velocity is greater than about 32 m/s.

* * * * *